(12) United States Patent
Ding et al.

(10) Patent No.: US 12,526,089 B2
(45) Date of Patent: Jan. 13, 2026

(54) WIRELESS COMMUNICATION METHOD AND FIRST DEVICE

(71) Applicant: GUANGDONG OPPO MOBILE TELECOMMUNICATIONS CORP., LTD., Dongguan (CN)

(72) Inventors: Yi Ding, Dongguan (CN); Zuomin Wu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 293 days.

(21) Appl. No.: 18/243,340

(22) Filed: Sep. 7, 2023

(65) Prior Publication Data

US 2023/0421308 A1    Dec. 28, 2023

Related U.S. Application Data

(63) Continuation of application No. PCT/CN2021/080086, filed on Mar. 10, 2021.

(51) Int. Cl.
  *H04L 1/1829* (2023.01)
  *H04W 74/0808* (2024.01)

(52) U.S. Cl.
  CPC ....... *H04L 1/1854* (2013.01); *H04W 74/0808* (2013.01)

(58) Field of Classification Search
  CPC .......... H04L 1/1854; H04W 72/0808
  See application file for complete search history.

(56) References Cited

U.S. PATENT DOCUMENTS

| | | | |
|---|---|---|---|
| 2020/0100284 A1 | 3/2020 | Li et al. | |
| 2022/0232625 A1* | 7/2022 | Liu | H04W 74/0808 |
| 2022/0264646 A1* | 8/2022 | Wang | H04W 74/0866 |
| 2022/0353045 A1* | 11/2022 | Zhao | H04L 1/1858 |

FOREIGN PATENT DOCUMENTS

| | | |
|---|---|---|
| CN | 110366264 A | 10/2019 |
| CN | 110972105 A | 4/2020 |
| CN | 111034340 A | 4/2020 |
| CN | 111630932 A | 9/2020 |
| WO | 2020022522 A1 | 1/2020 |

(Continued)

OTHER PUBLICATIONS

International Search Report and Written Opinion dated Nov. 25, 2021 in International Application No. PCT/CN2021/080086. English translation attached.

(Continued)

*Primary Examiner* — Joseph A Bednash
(74) *Attorney, Agent, or Firm* — Sheppard, Mullin, Richter & Hampton LLP

(57) ABSTRACT

Embodiments of the present disclosure provide a wireless communication method and a first device. The method includes: adjusting, by the first device, a contention window corresponding to each priority of at least one priority, based on feedback information for a first channel transmitted within a reference time unit or a reference time period. A transmission mode of the first channel includes at least one of a groupcast transmission mode, a multicast transmission mode, or a broadcast transmission mode.

17 Claims, 8 Drawing Sheets

(56) References Cited

FOREIGN PATENT DOCUMENTS

WO      2020060361  A1      3/2020
WO      2020060370  A1      3/2020

OTHER PUBLICATIONS

"3rd Generation Partnership Project;Technical Specification Group Radio Access Network;Physical layer procedures for shared spectrum channel access (Release 16)" 3GPP TS 37.213 V16.4.0, Jan. 2021,4.1.1, 4.1.2 and 4.1.4.
MCC Support"Final Report of 3GPP TSG RAN WG1 #96b v1.0.0"3GPP TSG RAN WG1 Meeting #97 R1-1905921, V1.0.0 May 2019. Section 7.2.4.5.
Nokia et al. "Featuire Lead's Surmnary #2 on (hannel Aceess Procedures." 3GPP 7SG RAN WGI Meeting 899 R1-J913517 Nov. 22, 2019 (Nov. 22, 2019), entire document.
Extended European Search Report dated Mar. 18, 2024 received in European Patent Application No. EP21929557.3.

* cited by examiner

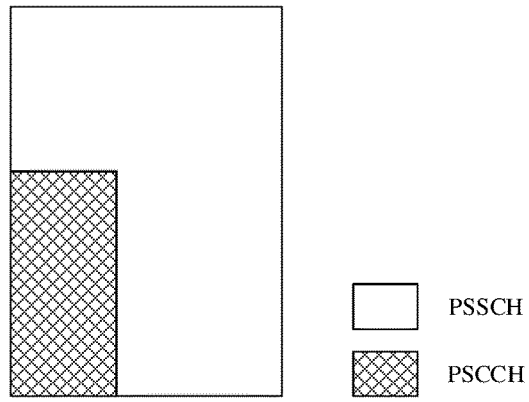

FIG. 7

Adjusting, by a first device, a contention window corresponding to each priority of at least one priority, based on feedback information for a first channel transmitted within a reference time unit or a reference time period, wherein a transmission mode of the first channel includes at least one of a groupcast transmission mode, a multicast transmission mode, or a broadcast transmission mode — S310

FIG. 8

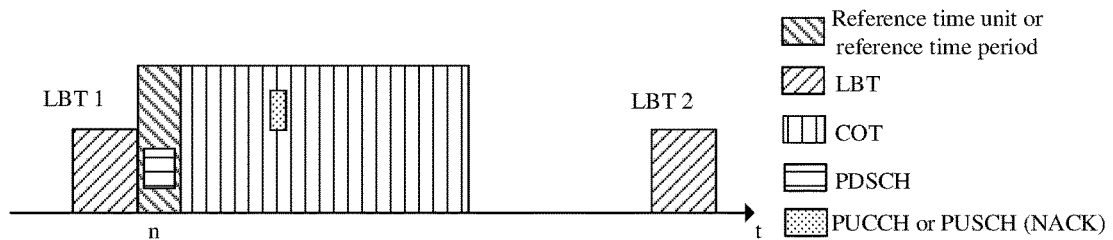

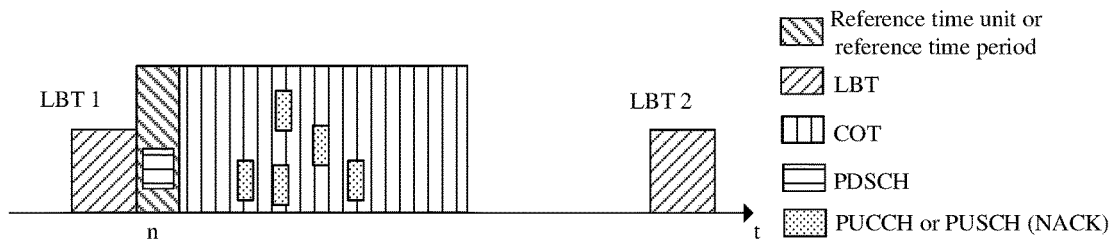

FIG. 9

WIRELESS COMMUNICATION METHOD AND FIRST DEVICE

CROSS-REFERENCE TO RELATED APPLICATIONS

This application is a continuation of International Application No. PCT/CN2021/080086 filed on Mar. 10, 2021, the entire contents of which are incorporated herein by reference.

FIELD

Embodiments of the present disclosure relate to the field of communication, and more particularly, to a wireless communication method and a first device.

BACKGROUND

Currently, in a New Radio Unlicensed (NR-U) system (an NR system on an unlicensed frequency spectrum), a communication device adjusts a contention window corresponding to each priority, based on a Hybrid Automatic Repeat reQuest (HARQ) feedback value corresponding to a Physical Downlink Shared Channel (PDSCH) transmitted within a past time unit or reference time period. However, only unicast is supported in the NR-U system. That is, each PDSCH within the above-mentioned reference time unit or reference time period only corresponds to an HARQ feedback value from one receiving device.

However, in groupcast, multicast, and broadcast scenarios, one PDSCH will correspond to HARQ feedback values from a plurality of receiving devices, and there are also cases where the receiving device provides no feedback for the PDSCH. Therefore, a method in the NR-U system for adjusting the contention window for a communication device in a unicast scenario is unsuitable for application in the groupcast, multicast, and broadcast scenarios. Also, when a Sidelink (SL) system is deployed on the unlicensed frequency spectrum, i.e., in an SL-U system, a corresponding solution is needed regarding how terminals performing groupcast, multicast, and broadcast adjust the contention windows.

SUMMARY

Embodiments of the present disclosure provide a wireless communication method and a first device.

In a first aspect, a wireless communication method is provided. The method includes: adjusting, by a first device, a contention window corresponding to each priority of at least one priority, based on feedback information for a first channel transmitted within a reference time unit or a reference time period. A transmission mode of the first channel includes at least one of a groupcast transmission mode, a multicast transmission mode, or a broadcast transmission mode.

In a second aspect, a first device is provided. The first device includes a processor and a memory. The memory is configured to store a computer program. The processor is configured to invoke and execute the computer program stored in the memory to perform the method in the above-mentioned first aspect or in any one of the implementations of the above-mentioned first aspect.

BRIEF DESCRIPTION OF THE DRAWINGS

FIG. 7 is a schematic diagram showing a physical layer structure of sidelink transmission according to an embodiment of the present disclosure.

FIG. 8 is a schematic flowchart illustrating a wireless communication method 300 according to an embodiment of the present disclosure.

FIG. 9 to FIG. 14 each are a schematic diagram showing feedback information for a first channel according to an embodiment of the present disclosure.

DETAILED DESCRIPTION

Technical solutions according to embodiments of the present disclosure will be described below in combination with accompanying drawings of the embodiments of the present disclosure. Obviously, the embodiments described below are only a part of the embodiments of the present disclosure, rather than all of the embodiments. On a basis of the embodiments in the present disclosure, all other embodiments obtained by a person skilled in the art without creative labor shall fall within the scope of the present disclosure.

Figure 1:
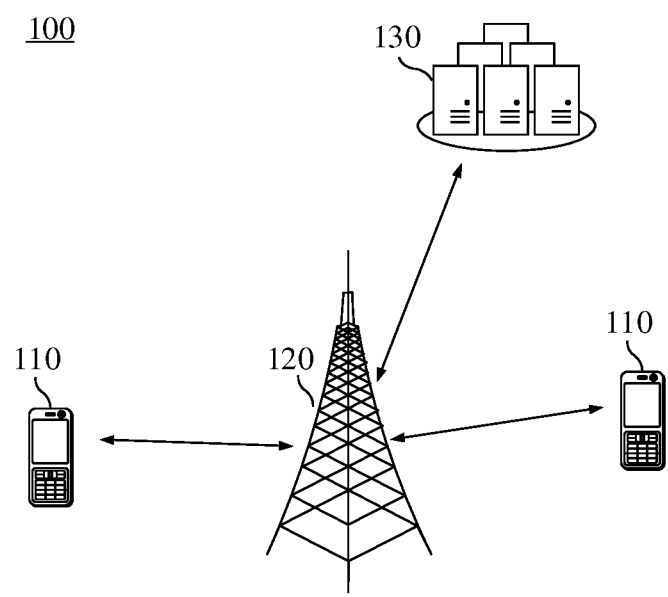
FIG. 1 is an example of a scenario according to an embodiment of the present disclosure.

FIG. 1 is a schematic diagram of an application scenario of an embodiment of the present disclosure.

As illustrated in FIG. 1, a communication system 100 may include a terminal device 110 and a network device 120. The network device 120 may communicate with the terminal device 110 via an air interface. Multi-service transmission is supported between the terminal device 110 and the network device 120.

It should be understood that the embodiments of the present disclosure are illustrated with the communication system 100 as an example and are not limited thereto. That is, the technical solutions according to the embodiments of the present disclosure can be applied to various communication systems, such as a Long Term Evolution (LTE) system, an LTE Time Division Duplex (TDD) system, a Universal Mobile Telecommunication System (UMTS), a Fifth Generation (5G) communication system (also known as a New Radio (NR) communication system), or a future communication system, etc.

In the communication system 100 illustrated in FIG. 1, the network device 120 may be an access network device in communication with the terminal device 110. The access network device may provide communication coverage for a specific geographic region and may communicate with the terminal device 110 (e.g., User Equipment) located in the coverage region.

The network device 120 may be a base station such as Evolutional Node B (eNB or eNodeB) in an LTE system, or a Next Generation Radio Access Network (NG RAN) device, or a base station such as the next Generation Node B (gNB) in an NR system, or a wireless controller in a Cloud Radio Access Network (CRAN). Alternatively, the network device 120 may be a relay station, an access point, a vehicle-mounted device, a wearable device, a hub, a switch, a bridge, a router, or a network device in a future evolved Public Land Mobile Network (PLMN), etc.

The terminal device 110 may be any terminal device, which includes, but is not limited to, a terminal device that is wired or wirelessly connected to the network device 120 or other terminal devices.

For example, the terminal device 110 can refer to an access terminal, a UE, a user unit, a user station, a mobile station, a mobile platform, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device having a wireless communication function, a computing device or another processing device connected to a wireless modem, a vehicle-mounted device, a wearable device, a terminal device in a 5G network, or a terminal device in the future evolved network, etc.

The terminal device 110 can be used for Device to Device (D2D) communication.

The wireless communication system 100 may further include a core network device 130 in communication with a base station. The core network device 130 may be a 5G Core (5GC) device, e.g., an Access and Mobility Management Function (AMF), an Authentication Server Function (AUSF), a User Plane Function (UPF), or a Session Management Function (SMF). Optionally, the core network device 130 may also be an Evolved Packet Core (EPC) device of an LTE network, e.g., a Session Management Function+Core Packet Gateway (SMF+PGW–C) device. It should be understood that SMF+PGW–C can simultaneously realize functions that SMF and PGW–C can realize. During evolution of a network, the above-mentioned core network device may also be called by other names or form a new network entity through a division of functions of the core network. The embodiments of the present disclosure are not limited in this regard.

Various functional units in the communication system 100 can also communicate with each other via a Next Generation (NG) network interface.

For example, the terminal device establishes an air interface connection with the access network device via an NR interface to transmit user plane data and control plane signaling. The terminal device can establish a control plane signaling connection with the AMF via an NG interface 1 (N1). The access network device, such as the next Generation Node B (gNB), can establish a user plane data connection with the UPF via an NG interface 3 (N3). The access network device can establish a control plane signaling connection with the AMF via an NG interface 2 (N2). The UPF can establish a control plane signaling connection with the SMF via an NG interface 4 (N4). The UPF can perform a user plane data interaction with a data network via an NG interface 6 (N6). The AMF can establish a control plane signaling connection with the SMF via an NG interface 11 (N11). The SMF can establish a control plane signaling connection with the PCF via an NG interface 7 (N7).

As an example, FIG. 1 illustrates one base station, one core network device, and two terminal devices. Optionally, the wireless communication system 100 may include a plurality of base station devices each may include other numbers of terminal devices within its coverage region. The embodiments of the present disclosure are not limited in this regard.

It should be understood that, in the embodiments of the present disclosure, any device having a communication function in a network/system may be referred to as a communication device. Taking the communication system 100 illustrated in FIG. 1 as an example, communication devices may include the network device 120 and the terminal devices 110. The network device 120 and the terminal device 110 may be any of specific devices described above, and details thereof will be omitted here. The communication device may also include another device in the communication system 100, for example, other network entities such as a network controller, a mobility management entity, etc., and the embodiments of the present disclosure are not limited to any of these examples.

It should be understood that terms "system" and "network" in the present disclosure are often used interchangeably herein. The term "and/or" in the present disclosure only represents a relationship between correlated objects, including three relationships. For example, "A and/or B" may mean three situations: A only, B only, or both A and B. In addition, the character "/" in the present disclosure generally represents an "or" relationship between the correlated objects preceding and succeeding the symbol.

It should be noted that the solutions of the present disclosure can be applied to an unlicensed frequency spectrum.

The unlicensed frequency spectrum is a spectrum allocated by countries and regions for radio device communication. The spectrum is generally considered to be a shared spectrum. That is, communication devices in different communication systems can use the spectrum as long as they meet regulatory requirements set by a corresponding country or region on the spectrum, without applying for proprietary spectrum authorization from the government. For example, a Wireless Fidelity (WIFI) system is deployed on the unlicensed frequency spectrum.

A bandwidth of transmission by a communication device over the unlicensed frequency spectrum is limited by regulations. That is, a span of a bandwidth occupied by transmission of the communication device should be at least L % of a total frequency spectrum bandwidth, with L=80 in general regulatory requirements. For example, assuming that a total bandwidth is 100 Physical Resource Blocks (PRBs), a lowest PRB index used by the communication device must differ from a highest PRB index used by the communication device by at least 80 during transmission of the communication device. If the communication device needs two PRBs to transmit data and occupies PRB 1, an index of the other PRB must be at least 81. In some cases, the communication device only needs to satisfy that a bandwidth occupied by the transmission is at least 2 MHz.

An LBT mechanism adopted in the unlicensed frequency spectrum is described below.

In the unlicensed frequency spectrum, all communication devices are required to perform LBT before transmitting a signal. That is, before transmitting a signal on a channel in the unlicensed frequency spectrum, the communication device needs to monitor the channel first, and can only transmit the signal when a monitoring result is that the channel is idle.

The LBT mechanism includes type 1 and type 2.

Figure 2:
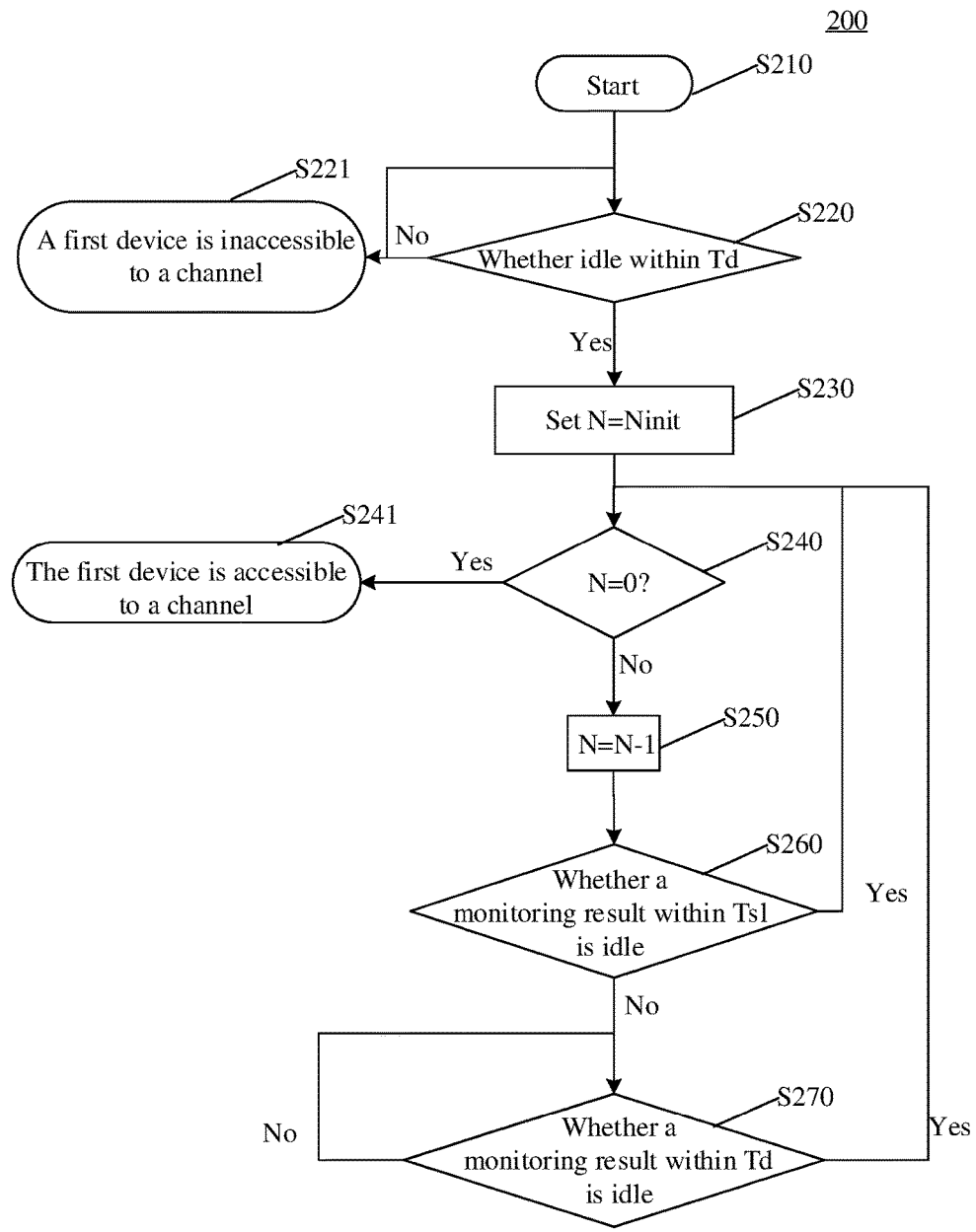
FIG. 2 is a flowchart illustrating a method for an LBT mechanism of type 1 according to an embodiment of the present disclosure.

FIG. 2 is a flowchart illustrating a method 200 for an LBT mechanism of type 1 according to an embodiment of the present disclosure. It should be noted that the method 200 may be performed by any device capable of performing LBT. For ease of description, the following content uses a first device as an example. The first device may be a network device or a terminal device. The embodiments of the present disclosure are not limited in this regard.

As illustrated in FIG. 2, the method 200 may include the following operations.

At S210, the first device is triggered to perform type 1 LBT.

At S220, the first device monitors a channel within a time period having a time length of Td, until it monitors that one monitoring slot is busy within the time period having the time length of Td, or monitors that all monitoring slots are idle within the time length of Td.

At S221, if the first device monitors that one monitoring slot is busy within the time period having the time length of Td, the first device cannot access a channel. Or, if the first device monitors that one monitoring slot is busy within the time period having the time length of Td, the first device jumps to S220.

At S230, if the first device monitors that all the monitoring slots within the time period are idle, the first device sets N=Ninit. Ninit is a random value ranging from 0 to $CW_p$.

At S240, the first device determines whether N is equal to 0.

At S241, if N is equal to 0 (N=0), LBT is successful, and the first device can occupy the channel and transmit data.

At S250, if N is not equal to 0 (i.e., N>0), the first device decreases N by 1, i.e., updates N to N−1.

At S260, the first device continues to monitor a channel within a time length of one monitoring slot, and jumps to S240 if the channel within the one monitoring slot is idle.

At S270, if the channel within the one monitoring slot is busy, the first device monitors a channel within the time period having the time length of Td, until it monitors that one monitoring slot is busy within the time period having the time length of Td, or monitors that all the monitoring slots are idle within the time length of Td. In some embodiments, if the first device monitors that one monitoring slot is busy within the time period having the time length of Td, the first device re-monitors the channel within the time period having the time length Td, and jumps to S240 if the first device monitors that all the monitoring slots within the time period are idle.

It should be noted that the above operations are performed sequentially if no jump is indicated. For example, the above-mentioned one monitoring slot is denoted as Tsl, Tsl being 9 microseconds. Ninit represents a random value ranging from 0 to $CW_p$. $CW_p$ is related to a priority of an access of the communication device to a channel. $CW_p$ may also be referred to as a contention window corresponding to a particular priority or a contention window determined based on a priority. The communication device determines values of $CW_{min,p}$, $CW_{max,p}$, and allowable $CW_p$ based on the priority of the access to the channel, i.e., a minimum value, a maximum value, and a possible value of the contention window based on the priority. Description is made below in conjunction with Table 1.

TABLE 1

| Allowable contention windows corresponding to individual priorities | | | | | |
|---|---|---|---|---|---|
| Channel access priority (p) | $m_p$ | $CW_{min,p}$ | $CW_{max,p}$ | $T_{mcot,p}$ | Allowable $CW_p$ value |
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

As shown in Table 1, when a priority of an access of the first device to a channel is 3, minimum, maximum, and possible values of a contention window the first device uses are 15, 1023, and {15,31,63,127,255,511,1023}, respectively. In fact, the first device maintains a corresponding size of a contention window for each priority, adjusts the contention window corresponding to each priority in accordance with a rule before determining Ninit each time, and then determines, based on a priority of a channel access, a contention window to be used for performing LBT this time so as to determine Ninit. For example, the first device maintains $CW_1$, $CW_2$, $CW_3$, and $CW_4$. When the first device performs type 1 LBT, the first device increases each of $CW_1$, $CW_2$, $CW_3$, and $CW_4$ to a next larger allowable value before determining Ninit. If the priority of the access of the first device to the channel is 1 this time, the first device performs type 1 LBT this time using the adjusted $CW_1$. As an example, Td=Tf+$m_p$*Tsl, where Tf is equal to 16 microseconds, and $m_p$ is related to a priority of a channel access. For example, the first device may determine a corresponding $m_p$ from Table 1 based on the priority.

In a case where the first device performs the above steps and LBT is successful, if the first device does not immediately access the channel and only accesses the channel when it needs to transmit data, the first device only needs to monitor channel occupancy during a time period of Td+at least one Tsl, instead of performing the entire process of type 1 LBT again. When the channel is idle, the first device can directly access the channel and transmit a signal.

When LBT of the first device is successful and the first device accesses the channel, the time for which the first device occupies the channel is referred to as Channel Occupancy Time (COT), during which the first device may perform continuous or discontinuous transmission, but total transmission time does not exceed $T_{mcot,p}$. $T_{mcot,p}$ is related to the priority of the channel access. For example, $T_{mcot,p}$ may be found in Table 1.

Unlike type 1 LBT, type 2 LBT only requires the first device to monitor a channel of a fixed length. If a monitoring slot is idle within the fixed length, the first device can directly access the channel. Specifically, type 2 is subdivided into three subtypes: type 2A, type 2B, and type 2C.

Type 2A: the first device can monitor a channel of 25 microseconds in length (denoted as Tshort). If a monitoring slot within Tshort is idle, the first device can directly access the channel.

Type 2B: the first device can monitor a channel of 16 microseconds in length (denoted as T0. If a monitoring slot in Tf is idle, the first device can directly access the channel.

Type 2C: the first device can access a channel directly without performing LBT. This type can only be used in a case where an interval between a current transmission and a previous transmission is smaller than or equal to 16 microseconds. Also, a length of the current transmission does not exceed 584 microseconds.

To facilitate understanding of the solutions of the present disclosure, solutions of how the first device adjusts the contention window in a unicast scenario in type 1 LBT are described below.

Adjusting the contention window corresponding to each priority before determining Ninit includes the following methods.

Method 1:

The first device maintains the contention window corresponding to each priority, and initializes the contention window corresponding to each priority to a minimum value of the contention window allowable for each priority. For example, the first device maintains $CW_1$, $CW_2$, $CW_3$, and $CW_4$, and initializes $CW_1$, $CW_2$, $CW_3$, and $CW_4$ to minimum values 3, 7, 15, and 15 in Table 1 of contention windows allowable for individual priorities.

The first device adjusts the contention window corresponding to each priority before determining Ninit. The first device determines a reference time unit. When at least Z % of HARQ feedback values corresponding to one or more PDSCHs transmitted by the first device within the reference time unit are Negative Acknowledgement (NACKs), the first device increases the contention window corresponding to each priority to a next allowable value corresponding to the priority. Otherwise, the first device sets the contention window corresponding to each priority to the minimum value of the contention window allowable for the priority. Optionally, the above-mentioned reference time unit is a start time unit of a channel occupancy by the first device's last transmission. For example, the start time unit is a start symbol or slot or subframe.

Figure 3:
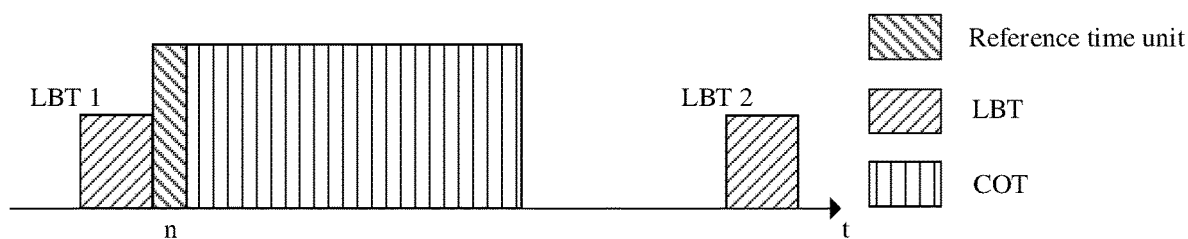
FIG. 3 and FIG. 4 each are a schematic diagram showing LBT according to an embodiment of the present disclosure.

FIG. 3 is a schematic diagram showing LBT according to an embodiment of the present disclosure.

As illustrated in FIG. 3, the first device maintains $CW_1$, $CW_2$, $CW_3$, and $CW_4$, and adjusts $CW_1$, $CW_2$, $CW_3$, and $CW_4$ in an execution of type 1 LBT, e.g., LBT 2, before determining Ninit. The channel occupancy by the first device's last transmission is a channel access of the first device subsequent to a success of a last execution of LBT (LBT 1). Thus, the first device determines HARQ feedback values corresponding to one or more PDSCHs transmitted within a time unit n, and increases each of $CW_1$, $CW_2$, $CW_3$, and $CW_4$ to the next allowable value when at least Z % of the HARQ feedback values are NACKs. Assuming that $CW_1$, $CW_2$, $CW_3$, and $CW_4$ are 3, 7, 15, and 15 before an adjustment, $CW_1$, $CW_2$, $CW_3$, and $CW_4$ may be increased to 7, 15, 31, and 31 in accordance with information in Table 1. Otherwise, each of $CW_1$, $CW_2$, $CW_3$, and $CW_4$ may be set to the minimum value of the contention window allowable for each priority in Table 1, i.e., 3, 7, 15, and 15.

In the above process of maintaining and adjusting the contention window corresponding to each priority, for a contention window $CW_p$ having a particular priority p, when $CW_p$ is already a maximum value of a contention window corresponding to the priority p, $CW_p$ increased to a next allowable value is still the maximum value of the contention window corresponding to the priority p. When $CW_p$ has been equal to the maximum value of the contention window corresponding to the priority p for k consecutive times and is used to generate Ninit, $CW_p$ is set to a minimum value of the contention window corresponding to the priority p.

Method 2:

The first device maintains the contention window corresponding to each priority, and initializes the contention window corresponding to each priority to the minimum value of the contention window allowable for each priority. For example, the first device maintains $CW_1$, $CW_2$, $CW_3$, and $CW_4$, and initializes $CW_1$, $CW_2$, $CW_3$, and $CW_4$ to the minimum values 3, 7, 15, and 15 in Table 1 of contention windows allowable for individual priorities.

The first device adjusts the contention window corresponding to each priority before performing the operation of determining Ninit in type 1 LBT. When an HARQ feedback value is available after a last update of the contention window corresponding to each priority, e.g., when the first device transmits a PDSCH and obtains a corresponding HARQ feedback value, the first device adjusts the contention window of each priority based on the HARQ feedback value corresponding to the transmitted PDSCH. In some embodiments, subsequent to the last update of the contention window of each priority, the first device may occupy a channel several times for transmission. Each time period of channel occupancy corresponds to one reference time period. For example, in general, a start point of the reference time period coincides with a start point of the time period of the channel occupancy, and an end point of the reference time period is an end position of a start slot of transmission of the PDSCH by the first device through the channel occupancy or an end position of a first group of PDSCH transmission opportunities transmitted by the first device through the channel occupancy. The group of PDSCH transmission opportunities mentioned above is defined as a group of consecutive PDSCH transmissions with an interval smaller than x microseconds. The first device determines one or more reference time periods subsequent to the last update, and determines, from the one or more reference time periods, a last reference time period in which the HARQ feedback value for the transmitted PDSCH is available. The first device adjusts the contention window of each priority based on the HARQ feedback values corresponding to the one or more transmitted PDSCHs within the determined reference time period.

Figure 4:
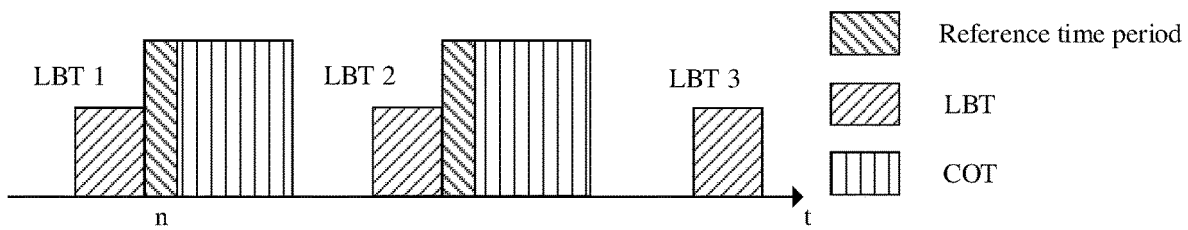

FIG. 4 is another schematic diagram showing LBT according to an embodiment of the present disclosure.

As illustrated in FIG. 4, the first device performs LBT 1, i.e., type 1 LBT, with the contention window of each priority updated before determining Ninit, performs LBT 2, i.e., type 2 LBT, without updating the contention window, and needs to adjust the contention window of each priority before performing LBT 3, i.e., type 1 LBT. After the last update, the first device occupies the channel twice, each time of channel occupancy corresponding to one reference time period. An HARQ feedback value corresponding to the PDSCH transmitted by the first device is available within a first reference time period n. An HARQ feedback value corresponding to the PDSCH transmitted by the first device is unavailable within a reference time period subsequent to LBT 2. Thus, the first device adjusts the contention window corresponding to each priority based on HARQ feedback values corresponding to one or more PDSCHs transmitted by the first device within the reference time period n.

The first device adjusts the contention window of each priority based on the HARQ feedback values corresponding to the one or more PDSCHs transmitted within the determined reference time period. In some embodiments, when at least one HARQ feedback value corresponding to the one or more PDSCHs is an Acknowledgement (ACK), the first device sets a size of each contention window to the minimum value of the contention window allowable for each priority. Otherwise, the contention window corresponding to each priority is increased to a next higher allowable value corresponding to each priority.

When HARQ feedback is unavailable subsequent to the last update performed by the first device on the contention window corresponding to each priority, the contention window corresponding to each priority is adjusted in accordance with the following two cases before determining Ninit. When data to be transmitted by the first device after this type 1 LBT include no retransmission or when this transmission is smaller than or equal to Tw from an end position of a reference time period corresponding to a time period of a last channel occupancy, the contention window corresponding to each priority is kept at a previous value, i.e., the size of each contention window remains unchanged. Otherwise, the first device increases the contention window corresponding to each priority to the next allowable value corresponding to the priority. For example, in FIG. 3, the first device adjusts the contention window corresponding to each priority in LBT 3 before determining Ninit. When LBT 3 is successful this time and the data to be transmitted by the first device includes no retransmission, the first device changes no contention window corresponding to each priority.

In the above process of maintaining and adjusting the contention window corresponding to each priority, for the contention window $CW_p$ having the particular priority p, when $CW_p$ is already the maximum value of the contention window corresponding to the priority p, $CW_p$ increased to the next allowable value is still the maximum value of the contention window corresponding to the priority p. When $CW_p$ has been equal to the maximum value of the contention window corresponding to the priority p for k consecutive times and is used to generate Ninit, $CW_p$ is set to the minimum value of the contention window corresponding to the priority p.

It should be noted that the solution provided by the present disclosure is also applicable to Sidelink (SL) transmission.

The SL transmission refers to direct transmission between terminals via a sidelink, which is different from a method of a conventional cellular system where communication data is received or transmitted via a base station. The SL transmission (V2V) method is also supported in vehicle to everything (V2X) systems. As a result, a higher frequency spectrum efficiency and a lower transmission latency are obtained. With regard to the SL transmission, the 3rd Generation Partnership Project (3GPP) defines two transmission modes: Mode A and Mode B.

Figure 5:
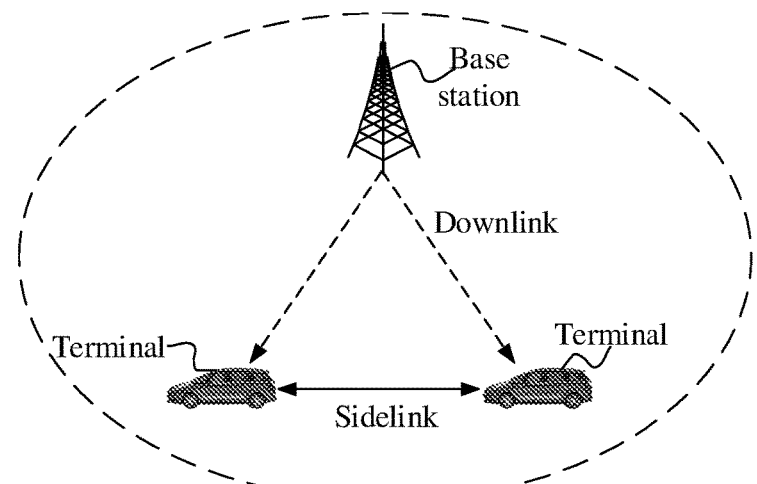
FIG. 5 is a schematic diagram showing Mode A according to an embodiment of the present disclosure.

FIG. 5 is a schematic diagram showing Mode A according to an embodiment of the present disclosure.

As illustrated in FIG. 5, transmission resources of an SL UE are allocated by a base station. The SL UE transmits data on a sidelink based on resources allocated by the base station. The base station can allocate resources for single transmission to the SL UE or resources for semi-persistent transmission to the SL UE.

Figure 6:
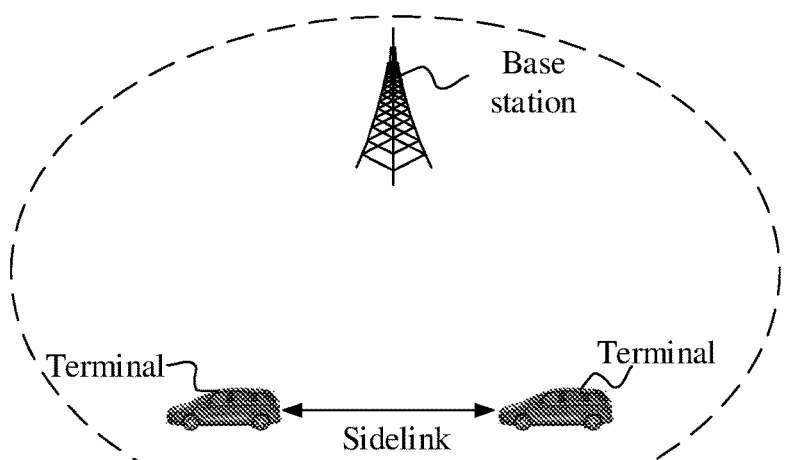
FIG. 6 is a schematic diagram showing Mode B according to an embodiment of the present disclosure.

FIG. 6 is a schematic diagram showing Mode B according to an embodiment of the present disclosure.

As illustrated in FIG. 6, the SL UE selects, from a resource pool, a resource for transmission of data. In some embodiments, the SL UE may select a transmission resource from the resource pool by means of monitoring or by means of a random selection.

It should be noted that the SL UE in the embodiments of the present disclosure is a terminal performing the sidelink transmission. For example, the SL UE may be a terminal in D2D or a vehicle terminal in V2X.

FIG. 7 is a schematic diagram showing a physical layer structure of sidelink transmission according to an embodiment of the present disclosure.

As illustrated in FIG. 7, in the sidelink transmission, a Physical Sidelink Control Channel (PSCCH) is configured to transmit first sidelink control information, and a Physical Sidelink Shared Channel (PSSCH) is configured to carry data and second sidelink control information. The PSCCH and PSSCH are transmitted in a same slot. The first sidelink control information is carried in the PSCCH and mainly contains fields related to resource monitoring to facilitate performing, by other UEs, a resource exclusion and resource selection after decoding of the first sidelink control information. The PSSCH also carries the second sidelink control information in addition to the data. The second sidelink control information mainly includes fields related to data demodulation to facilitate demodulating, by other UEs, the data in the PSSCH.

In addition, to facilitate understanding of the solutions of the present disclosure, HARQ feedback involved in the present disclosure is first described below.

The HARQ feedback means that: a receiving terminal decodes data transmitted by a transmitting terminal; an NACK is fed back when decoding fails, while an ACK is fed back when the decoding succeeds. The transmitting terminal determines, based on HARQ feedback information from the receiving terminal, whether to perform retransmission. Also, the receiving terminal will also merge data transmitted several times by the transmitting terminal to improve a probability of successful decoding.

Typically, there are two kinds of HARQ feedback methods: NACK-Only and ACK-or-NACK.

NACK-Only means that the receiving terminal only feeds back an NACK to the transmitting terminal when reception fails, and provides no feedback to the transmitting terminal when the reception is successful.

ACK-or-NACK means that the receiving terminal feeds back an NACK to the transmitting terminal when reception fails and an ACK to the transmitting terminal when the reception is successful.

NACK-Only has a problem of Discontinuous Reception (DRX). When performing decoding, the receiving terminal usually decodes control information first and then decodes data based on the content in the control information. When no control information is monitored, the receiving terminal provides no feedback. In the NACK-Only feedback method, the transmitting terminal is thus incapable of determining whether the data is successfully decoded by the receiving terminal or no control information is detected by the receiving terminal at all.

In groupcast, multicast, and broadcast scenarios, the transmitting terminal transmits data to a group of receiving terminals on a same resource.

Feeding back HARQ information by a group of receiving terminals by means of the NACK-Only feedback method may include the following two cases.

Case 1-1:

All the receiving terminals in a group of receiving terminals feed back NACKs on a same resource. The transmitting terminal can determine whether to perform retransmission, based on a detection of an NACK or a certain number of NACKs on the resource or based on measurement of received energy or power.

Case 1-2:

All the receiving terminals in a group of receiving terminals each feeds back an NACK on an independent resource. The transmitting terminal can determine whether to perform retransmission, based on a detection of an NACK or a proportion of detected NACKs or a quantity of detected NACKs or a quantity of resources on which NACKs have been detected.

Feeding back the HARQ information by a group of receiving terminals by means of the ACK/NACK feedback method may include the following two cases.

Case 2-1:

All the receiving terminals in a group of receiving terminals feed back an ACK on a same resource and an NACK on another resource.

Case 2-2:

All the receiving terminals in a group of receiving terminals feed back ACKs or NACKs on respective independent resources.

When the group of receiving terminals feed back the HARQ information by means of the ACK/NACK feedback method, the transmitting terminal can determine whether to perform retransmission, based on a quantity or a proportion of counted ACKs or a quantity or a proportion of NACKs or a ratio of a quantity of ACKs to a quantity of NACKs.

For example, resources used by the above-mentioned receiving terminal for feedback of NACKs or ACKs include a Physical Uplink Control Channel (PUCCH) resource or a Physical Uplink Shared Channel (PUSCH) resource or a Physical Sidelink Feedback Channel (PSFCH) resource.

With the improvement of communication standards, Multimedia Broadcast Multicast Service (MBMS) was introduced in 3GPP Release 6 (R6), and 3GPP R17 also discusses how to support groupcast, multicast, and broadcast transmission modes in NR systems. Groupcast and broadcast transmission modes are technologies for transmitting data from a single data source to a plurality of receiving devices through sharing network resources, making efficient use of the network resources and ensuring a high transmission rate. For example, a base station simultaneously transmits, via a same PDSCH resource, data to all UEs that may receive the PDSCH (broadcast). Or, the base station transmits data to a group of UEs simultaneously via a same PDSCH resource (multicast or groupcast). In other words, the base station transmits, on a time frequency resource, data to a target group of UEs that may include all UEs that can receive the data (broadcast), and may also include a specific group of UEs (multicast or groupcast). In addition, broadcast and groupcast/multicast are also supported in the SL. A UE may transmit, via a same PSSCH, data to all UEs that may receive the PSSCH (broadcast). Or, a UE may transmit data to a group of UEs via a same PSSCH (groupcast). For example, the group of UEs may be UEs within a certain distance range or UEs having a stable connection to a transmitting UE.

Although the above content describes a method in the existing NR-U system (NR system on the unlicensed frequency spectrum) for adjusting the contention window corresponding to each priority by the first device based on an HARQ feedback value corresponding to a PDSCH transmitted within a past time unit or reference time period, only unicast is currently supported in the NR-U system. That is, each PDSCH within the above-mentioned reference time unit or reference time period only corresponds to an HARQ feedback value from one receiving terminal. However, in the groupcast, multicast, and broadcast scenarios, one PDSCH will correspond to HARQ feedback values from a plurality of receiving devices, and there are also cases where the receiving device provides no feedback for the PDSCH. Therefore, the method in the NR-U system for adjusting the contention window by the communication device for the unicast scenario is unsuitable for application in the groupcast, multicast, and broadcast scenarios. Also, when an SL system is deployed on the unlicensed frequency spectrum, i.e., in an SL-U system, a corresponding solution is needed regarding how terminals performing groupcast, multicast, and broadcast adjust the contention windows.

Therefore, for the groupcast, multicast, and broadcast scenarios, the embodiments of the present disclosure provide a wireless communication method and a first device, which can not only be used to adjust a contention window, but also avoid the use of a same contention window when a plurality of first devices performs LBT, thereby facilitating a reduction in interference between the plurality of first devices.

FIG. 8 is a schematic flowchart illustrating a wireless communication method 300 according to an embodiment of the present disclosure. The method 300 may be executed by the first device, e.g., the network device illustrated in FIG. 1, or the terminal device illustrated in FIG. 5 or FIG. 6.

As illustrated in FIG. 8, the method 300 may include some or all of the following content.

At S310, the first device adjusts a contention window corresponding to each priority of at least one priority, based on feedback information for a first channel transmitted within a reference time unit or a reference time period. A transmission mode of the first channel includes at least one of a groupcast transmission mode, a multicast transmission mode, or a broadcast transmission mode. For example, the transmission mode of the first channel includes at least one of the groupcast transmission mode, the multicast transmission mode, and the broadcast transmission mode. For example, the transmission mode of the first channel is the groupcast transmission mode, the multicast transmission mode, or the broadcast transmission mode.

In the embodiment, the first device adjusts the contention window corresponding to each priority of the at least one priority based on the feedback information for the first channel transmitted within the reference time unit or the reference time period, which can avoid adjusting, based on feedback information transmitted by only one receiving device, the contention window corresponding to each priority of the at least one priority. The method provided by the present disclosure can be applied to adjusting, by the first device, the contention window in the groupcast, multicast, and broadcast scenarios, e.g., adjusting, by the first device, the contention window in the groupcast, multicast, and broadcast scenarios under the NR-U and SL-U, which can avoid the use of a same contention window when a plurality of first devices performs LBT, thereby facilitating the reduction in the interference between the plurality of first devices.

In some embodiments, the operation at S310 can include: when a feedback scheme for the first channel is an NACK-Only feedback scheme of feeding back NACK only, adjusting, by the first device, the contention window corresponding to each priority based on at least one of a quantity of received NACKs, a proportion of the received NACKs, or power on a resource used to receive the NACK.

In an implementation, the operation at S310 can include: when second devices corresponding to the first channel transmit feedback information on a same resource, adjusting, by the first device, the contention window corresponding to each priority in accordance with at least one of the following 1, 2, 3, 4, 5, or 6. For example, when all second devices corresponding to the first channel transmit the feedback information on a same resource, the first device adjusts the contention window corresponding to each priority in accordance with at least one of the following 1, 2, 3, 4, 5, or 6.

1. When the NACK is received, the contention window corresponding to each priority can be increased to a next allowable value.

2. When the quantity of the received NACKs is greater than or equal to P, the contention window corresponding to each priority can be increased to the next allowable value. P can be configured by a network, can be preconfigured, can be predefined, or can be dependent on an implementation of the first device. Optionally, P is greater than or equal to 0. For example, P is greater than 0.

3. When received power measured on the resource receiving the NACK is greater than or equal to a threshold H, the contention window corresponding to each priority can be increased to the next allowable value. H can be configured by the network, can be preconfigured, can be predefined, or can be dependent on the implementation of the first device. Optionally, H may be an integer or a non-integer. Optionally, the received power includes, but is not limited to, Reference Signal Receiving Power (RSRP) and/or Received Signal Strength Indication (RSSI).

4. When no NACK is received, the contention window corresponding to each priority can be adjusted to a minimum allowable value.

5. When the quantity of the received NACKs is smaller than or equal to P, the contention window corresponding to each priority can be adjusted to the minimum allowable value.

6. When the received power measured on the resource receiving the NACK is smaller than or equal to the threshold H, the contention window corresponding to each priority can be adjusted to the minimum allowable value.

In an implementation, the operation at S310 can include: when second devices corresponding to the first channel transmit feedback information on their respective independent resources, adjusting, by the first device, the contention window corresponding to each priority in accordance with at least one of the following 1, 2, 3, 4, 5, or 6. For example, when all second devices corresponding to the first channel transmit the feedback information on their respective independent resources, the first device adjusts the contention window corresponding to each priority in accordance with at least one of the following 1, 2, 3, 4, 5, or 6.

1. When the NACK is received, the contention window corresponding to each priority can be increased to a next allowable value.

2. When the quantity of the received NACKs is greater than or equal to P, the contention window corresponding to each priority can be increased to the next allowable value. P can be configured by a network, can be preconfigured, can be predefined, or can be dependent on an implementation of the first device. Optionally, P is greater than or equal to 0. For example, P is greater than 0.

3. When the proportion of the received NACKs is greater than or equal to F %, the contention window corresponding to each priority can be increased to the next allowable value. F can be configured by the network, can be preconfigured, can be predefined, or can be dependent on the implementation of the first device. Optionally, F is greater than or equal to 0. For example, F is greater than 0. Optionally, F may be an integer or a non-integer.

4. When no NACK is received, the contention window corresponding to each priority can be adjusted to a minimum allowable value.

5. When the quantity of the received NACKs is smaller than or equal to P, the contention window corresponding to each priority can be adjusted to the minimum allowable value.

6. When the proportion of the received NACKs is smaller than or equal to F %, the contention window corresponding to each priority can be adjusted to the minimum allowable value.

In some embodiments, the operation at S310 can include: when a feedback scheme for the first channel is an ACK/NACK feedback scheme of feeding back ACK/NACK, adjusting, by the first device, the contention window corresponding to each priority based on at least one of a quantity of received ACKs, a proportion of the received ACKs, power on a resource used to receive the ACK, a quantity of received NACKs, a proportion of the received NACKs, or power on a resource used to receive the NACK.

In an implementation, the operation at S310 can include: when second devices corresponding to the first channel feed back the ACK on a first resource and the NACK on a second resource different from the first resource, adjusting, by the first device, the contention window corresponding to each priority in accordance with at least one of the following 1, 2, 3, 4, 5, or 6. For example, when all second devices corresponding to the first channel feed back the ACK on the first resource and the NACK on the second resource, the first device adjusts the contention window corresponding to each priority in accordance with at least one of the following 1, 2, 3, 4, 5, or 6.

1. When the quantity of the received NACKs is greater than or equal to a threshold A, and/or when the quantity of the received ACKs is smaller than or equal to a threshold B, the contention window corresponding to each priority can be increased to a next allowable value. Each of A and B can be configured by a network, can be preconfigured, can be predefined, or can be dependent on an implementation of the first device. Optionally, A is greater than or equal to 0. For example, A is greater than 0. Optionally, B is greater than or equal to 0. For example, B is greater than 0. Optionally, A or B may be equal to 0. Optionally, A may be or may not be equal to B.

2. When a ratio or a difference between the quantity of the received NACKs and the quantity of the received ACKs is greater than or equal to a threshold C, and/or when a ratio or a difference between the quantity of the received ACKs and the quantity of the received NACKs is smaller than or equal to a threshold D, the contention window corresponding to each priority can be increased to the next allowable value. Each of C and D can be configured by the network, can be preconfigured, can be predefined, or can be dependent on the implementation of the first device. Optionally, C may be an integer, a non-integer, a positive number, or a non-positive number. Optionally, D may be an integer, a non-integer, a positive number, or a non-positive number.

3. When a ratio or a difference between received power measured on the resource receiving the NACK and received power measured on the resource receiving the ACK is greater than or equal to a threshold E, and/or when a ratio or a difference between the received power measured on the resource receiving the ACK and the received power measured on the resource receiving the NACK is smaller than or equal to a threshold F, the contention window corresponding to each priority can be increased to the next allowable value. Each of E and F can be configured by the network, can be preconfigured, can be predefined, or can be dependent on the implementation of the first device. Optionally, E may be an integer, a non-integer, a positive number, or a non-positive number. Optionally, F may be an integer, a non-integer, a positive number, or a non-positive number. Optionally, the received power includes, but is not limited to, RSRP and/or RSSI.

4. When the quantity of the received NACKs is smaller than or equal to a threshold G, and/or when the quantity of the received ACKs is greater than or equal to a threshold H, the contention window corresponding to each priority can be adjusted to a minimum allowable value. Each of H and G can be configured by the network, can be preconfigured, can be predefined, or can be dependent on the implementation of the first device. Optionally, H is greater than or equal to 0. For example, H is greater than 0. Optionally, G is greater than or equal to 0. For example, G is greater than 0. Optionally, H or G may be equal to 0. Optionally, G may be or may not be equal to H.

5. When the ratio or the difference between the quantity of the received NACKs and the quantity of the received ACKs is smaller than or equal to a threshold I, and/or when the ratio or the difference between the quantity of the received ACKs and the quantity of the received NACKs is greater than or equal to a threshold J, the contention window corresponding to each priority can be adjusted to the minimum allowable value. Optionally, I may be an integer, a non-integer, a positive number, or a non-positive number. Optionally, J may be an integer, a non-integer, a positive number, or a non-positive number.

6. When the ratio or the difference between the received power measured on the resource receiving the NACK and the received power measured on the resource receiving the ACK is smaller than or equal to a threshold K, and/or when the ratio or the difference between the received power measured on the resource receiving the ACK and the received power measured on the resource receiving the NACK is greater than or equal to a threshold L, the contention window corresponding to each priority can be adjusted to the minimum allowable value. Each of K and L can be configured by the network, can be preconfigured, can be predefined, or can be dependent on the implementation of the first device. Optionally, K may be an integer, a non-integer, a positive number, or a non-positive number. Optionally, L may be an integer, a non-integer, a positive number, or a non-positive number. Optionally, the received power includes, but is not limited to, RSRP and/or RSSI.

In an implementation, the operation at S310 can include: when second devices corresponding to the first channel feed back the ACK or the NACK on their respective independent resources, adjusting, by the first device, the contention window corresponding to each priority in accordance with at least one of the following 1, 2, 3, 4, 5, or 6. For example, when all second devices corresponding to the first channel feed back the ACK or the NACK on their respective independent resources, the first device adjusts the contention window corresponding to each priority in accordance with at least one of the following 1, 2, 3, 4, 5, or 6.

1. When the quantity of the received NACKs is greater than or equal to a threshold M, and/or when the quantity of the received ACKs is smaller than or equal to a threshold O, the contention window corresponding to each priority can be increased to a next allowable value. Each of M and O can be configured by a network, can be preconfigured, can be predefined, or can be dependent on an implementation of the first device. Optionally, M is greater than or equal to 0. For example, M is greater than 0. Optionally, O is greater than or equal to 0. For example, O is greater than 0.

2. When a ratio or a difference between the quantity of the received NACKs and the quantity of the received ACKs is greater than or equal to a threshold N, and/or when a ratio or a difference between the quantity of the received ACKs and the quantity of the received NACKs is smaller than or equal to a threshold P, the contention window corresponding to each priority can be increased to the next allowable value. Each of N and P can be configured by the network, can be preconfigured, can be predefined, or can be dependent on the implementation of the first device. Optionally, N may be an integer, a non-integer, a positive number, or a non-positive number. Optionally, P may be an integer, a non-integer, a positive number, or a non-positive number.

3. When a ratio between the quantity of the received NACKs and a quantity of receivable ACKs/NACKs is greater than or equal to a threshold Q, and/or when a ratio between the quantity of the received ACKs and the quantity of the receivable ACKs/NACKs is smaller than or equal to a threshold R, the contention window corresponding to each priority can be increased to the next allowable value. Each of Q and R can be configured by the network, can be preconfigured, can be predefined, or can be dependent on the implementation of the first device. Optionally, Q may be an integer, a non-integer, a positive number, or a non-positive number. Optionally, R may be an integer, a non-integer, a positive number, or a non-positive number.

4. When the quantity of the received NACKs is smaller than or equal to a threshold S, and/or when the quantity of the received ACKs is greater than or equal to a threshold T, the contention window corresponding to each priority can be adjusted to a minimum allowable value. Each of S and T can be configured by the network, can be preconfigured, can be predefined, or can be dependent on the implementation of the first device. Optionally, S is greater than or equal to 0. For example, S is greater than 0. Optionally, T is greater than or equal to 0. For example, T is greater than 0.

5. When the ratio or the difference between the quantity of the received NACKs and the quantity of the received ACKs is smaller than or equal to a threshold U, and/or when the ratio or the difference between the quantity of the received ACKs and the quantity of the received NACKs is greater than or equal to a threshold V, the contention window corresponding to each priority can be adjusted to the minimum allowable value. Each of U and V can be configured by the network, can be preconfigured, can be predefined, or can be dependent on the implementation of the first device. Optionally, U may be an integer, a non-integer, a positive number, or a non-positive number. Optionally, V may be an integer, a non-integer, a positive number, or a non-positive number.

6. When the ratio between the quantity of the received NACKs and the quantity of the receivable ACKs/NACKs is smaller than or equal to a threshold W, and/or when the ratio between the quantity of the received ACKs and the quantity of the receivable ACKs/NACKs is greater than or equal to a threshold X, the contention window corresponding to each priority can be adjusted to the minimum allowable value. Each of W and X can be configured by the network, can be preconfigured, can be predefined, or can be dependent on the implementation of the first device. Optionally, W may be an integer, a non-integer, a positive number, or a non-positive number. Optionally, X may be an integer, a non-integer, a positive number, or a non-positive number.

In some embodiments, the operation at S310 can include: when the first channel corresponds to no feedback information, adjusting, by the first device, the contention window corresponding to each priority based on a contention window used for a last channel occupancy or based on a received power measurement result. That is, when the first channel has no feedback or corresponds to no feedback method, the first device adjusts the contention window corresponding to each priority based on the contention window used for the last channel occupancy or based on the received power measurement result.

In an implementation, the operation at S310 can include: adjusting, by the first device based on the contention window used for the last channel occupancy or based on the received power measurement result, the contention window corresponding to each priority in accordance with at least one of the following methods 1, 2, or 3.

1. The first device can adjust the contention window corresponding to each priority to the contention window used or adjusted for the last channel occupancy.

2. When a channel of a time length Y is monitored and monitored energy or power is greater than or equal to a threshold Z, the contention window corresponding to each priority can be increased to a next allowable value. Y can be configured by a network, can be preconfigured, can be predefined, or can be dependent on an implementation of the first device. Optionally, Y is a monitoring slot Tsl, or a monitoring time length Td or Tf determined based on Tsl.

3. When the channel of the time length Y is monitored and the monitored energy or power is smaller than or equal to the threshold Z, the contention window corresponding to each priority can be adjusted to a minimum allowable value.

In some embodiments, the first channel can correspond to no feedback information in at least one of the following cases: the first channel is used for blind retransmission; the first device is a terminal device, and no PSFCH resource is configured for a resource pool used by the terminal device; or the first device is the terminal device, and HARQ feedback is de-activated in the resource pool used by the terminal device.

In some embodiments, the first device can be a network device, and the first channel can include a PDSCH.

In some embodiments, the first device can be a terminal device, and the first channel can include a PSCCH and/or a PSSCH.

In some embodiments, the method 300 can further include: determining, by the first device, the reference time unit or the reference time period.

In some embodiments, the reference time unit can be a start time unit of a last channel occupancy of the first device, and/or the reference time period can be a start time period of the last channel occupancy of the first device.

In some embodiments, the method 300 can further include: receiving, by the first device, feedback information corresponding to the first channel within the reference time unit or the reference time period.

Specific embodiments of the present disclosure are described below with examples of downlink transmission and sidelink transmission.

Embodiment 1

In the embodiment, the first device is the network device, the first channel is the PDSCH, and a group of receiving terminals feed back the HARQ information by means of the NACK-Only feedback method. The network device adjusts the contention window corresponding to each priority of the at least one priority, based on feedback information for the PDSCH transmitted within the reference time unit or the reference time period.

In an implementation, all terminal devices corresponding to the PDSCH use the feedback method described above in Case 1-1.

The network device adjusts the contention window corresponding to each priority in accordance with at least one of the following 1, 2, 3, 4, 5, or 6.

1. When an NACK is received by the network device, the contention window corresponding to each priority is increased to a next allowable value.

2. When a quantity of NACKs received by the network device is greater than or equal to P, the contention window corresponding to each priority is increased to the next allowable value. P is configured by a network, is preconfigured, is predefined, or is dependent on an implementation of the network device. Optionally, P is greater than or equal to 0. For example, P is greater than 0.

3. When received power measured by the network device on a resource receiving the NACK is greater than or equal to a threshold H, the contention window corresponding to each priority is increased to the next allowable value. H is configured by the network, is preconfigured, is predefined, or is dependent on the implementation of the network device. Optionally, H may be an integer or a non-integer. Optionally, the received power includes, but is not limited to, RSRP and/or RSSI.

4. When no NACK is received by the network device, the contention window corresponding to each priority is adjusted to a minimum allowable value.

5. When the quantity of the NACKs received by the network device is smaller than or equal to P, the contention window corresponding to each priority is adjusted to the minimum allowable value.

6. When the received power measured by the network device on the resource receiving the NACK is smaller than or equal to the threshold H, the contention window corresponding to each priority is adjusted to the minimum allowable value.

In another implementation, all the terminal devices corresponding to the PDSCH use the feedback method described above in Case 1-2.

The network device adjusts the contention window corresponding to each priority in accordance with at least one of the following 1, 2, 3, 4, 5, or 6.

1. When an NACK is received by the network device, the contention window corresponding to each priority is increased to a next allowable value.

2. When a quantity of NACKs received by the network device is greater than or equal to P, the contention window corresponding to each priority is increased to the next allowable value. P is configured by a network, is preconfigured, is predefined, or is dependent on an implementation of the network device. Optionally, P is greater than or equal to 0. For example, P is greater than 0.

3. When a proportion of the NACKs received by the network device is greater than or equal to F %, the contention window corresponding to each priority is increased to the next allowable value. F is configured by the network, is preconfigured, is predefined, or is dependent on the implementation of the network device. Optionally, F is greater than or equal to 0. For example, F is greater than 0. Optionally, F may be an integer or a non-integer.

4. When no NACK is received by the network device, the contention window corresponding to each priority is adjusted to a minimum allowable value.

5. When the quantity of the NACKs received by the network device is smaller than or equal to P, the contention window corresponding to each priority is adjusted to the minimum allowable value.

6. When the proportion of the NACKs received by the network device is smaller than or equal to F %, the contention window corresponding to each priority is adjusted to the minimum allowable value.

FIG. 9 is a schematic diagram showing feedback information for a first channel according to an embodiment of the present disclosure.

As illustrated in FIG. 9, LBT 2 is type 1 LBT. In LBT 2, the network device adjusts the contention window corresponding to each priority before determining Ninit. The network device determines the reference time unit or the reference time period. For example, the reference time unit is a start time unit of a last channel occupancy of the network device, and the time unit may be a slot or a symbol or a subframe. Or, the reference time unit is the start time unit of the last channel occupancy which satisfies the condition that an HARQ feedback value for the PDSCH transmitted within the reference time unit is available. For example, the reference time period is a reference time period corresponding to a time period of the last channel occupancy of the network device. Or, the reference time period is a reference time period corresponding to the time period of the last channel occupancy which satisfies the condition that an HARQ feedback value for the PDSCH transmitted within the reference time period is available. For the reference time period, e.g., in general, the start point of the reference time period coincides with the start point of the time period of the channel occupancy, and the end point of the reference time period is an end position of a start slot of transmission of the PDSCH by the network device through channel occupancy or an end position of a first group of PDSCH transmission opportunities transmitted by the network device through the channel occupancy. The group of PDSCH transmission opportunities mentioned above is defined as a group of consecutive PDSCH transmissions with an interval smaller than x microseconds. For example, in FIG. 9, the network device determines the reference time unit or the reference time period as a time length n.

Based on this, the network device transmits data to a plurality of UEs on a same PDSCH resource within the reference time unit or reference time period n. The transmission mode may be groupcast or multicast or broadcast.

When the above-mentioned plurality of UEs uses the feedback scheme of Case 1-1, e.g., in the upper part of FIG. 9, each of the above-mentioned plurality of UEs feeds back an NACK to the network device on a shared PUCCH or PUSCH resource in the figure only in response to a reception failure. The above-mentioned PUCCH or PUSCH resource is scheduled by the network device, or is configured by the network, or is pre-configured. In this case, adjusting, by the network device, the contention window corresponding to each priority based on HARQ feedback values corresponding to a groupcast or broadcast PDSCH transmitted within the reference time unit or reference time period n includes one or more of the following 1, 2, 3, 4, 5, or 6.

1. When an NACK is received by the network device on the PUCCH or PUSCH resource, the contention window corresponding to each priority is increased to the next allowable value.

2. When a quantity of NACKs received by the network device on PUCCH or PUSCH resources is greater than or equal to P, or when NACKs are received by the network device on at least P PUCCH or PUSCH resources, the contention window corresponding to each priority is increased to the next allowable value. P is configured by the network, is preconfigured, is predefined, or is dependent on the implementation of the network device. Optionally, P is greater than or equal to 0. For example, P is greater than 0.

3. When received power measured by the network device on the PUCCH or PUSCH resource is greater than or equal to the threshold H, the contention window corresponding to each priority is increased to the next allowable value. H is configured by the network, is preconfigured, is predefined, or is dependent on the implementation of the network device. Optionally, H may be an integer or a non-integer. Optionally, the received power includes, but is not limited to, RSRP and/or RSSI.

4. When no NACK is received by the network device on the PUCCH or PUSCH resource, the contention window corresponding to each priority is adjusted to the minimum allowable value.

5. When the quantity of the NACKs received by the network device on the PUCCH or PUSCH resources is smaller than or equal to P, or when a quantity of the PUCCH or PUSCH resources receiving the NACKs is smaller than or equal to P, the contention window corresponding to each priority is adjusted to the minimum allowable value.

6. When the received power measured by the network device on the PUCCH or PUSCH resource is smaller than or equal to the threshold H, the contention window corresponding to each priority is adjusted to the minimum allowable value.

When the above-mentioned plurality of UEs uses the feedback scheme of Case 1-2, e.g., in the lower part of FIG. 9, each of the above-mentioned plurality of UEs feeds back an NACK to the network device on its respective independent PUCCH or PUSCH resource only in response to a reception failure. In other words, each of the above-mentioned plurality of UEs corresponds to one independent PUCCH or PUSCH resource on which an NACK is fed back only in response to a decoding failure. The above-mentioned PUCCH or PUSCH resource is scheduled by the network device, or is configured by the network, or is pre-configured. In this case, adjusting, by the network device, the contention window corresponding to each priority based on the HARQ feedback values corresponding to the groupcast or broadcast PDSCH transmitted within the reference time unit or reference time period n includes one or more of the following 1, 2, 3, 4, 5, or 6.

1. When an NACK is received by the network device on any of all PUCCH or PUSCH resources, the contention window corresponding to each priority is increased to the next allowable value.

2. When a quantity of NACKs received by the network device on all the PUCCH or PUSCH resources is greater than or equal to P, or when NACKs are received by the network device on at least P PUCCH or PUSCH resources, the contention window corresponding to each priority is increased to the next allowable value. P is configured by the network, is preconfigured, is predefined, or is dependent on the implementation of the network device. Optionally, P is greater than or equal to 0. For example, P is greater than 0.

3. When a proportion of the NACKs received by the network device on all the PUCCH or PUSCH resources is greater than or equal to F %, i.e., when a proportion of the quantity of NACKs received by the network device on all the PUCCH or PUSCH resources to a quantity of receivable NACKs is greater than or equal to F %, or when a proportion of a quantity of PUCCH or PUSCH resources receiving the NACKs to a quantity of all the PUCCH or PUSCH resources is greater than or equal to F %, the contention window corresponding to each priority is increased to the next allowable value. F is configured by the network, is preconfigured, is predefined, or is dependent on the implementation of the network device. Optionally, F is greater than or equal to 0. For example, F is greater than 0. Optionally, F may be an integer or a non-integer.

4. When no NACK is received by the network device on all the PUCCH or PUSCH resources, the contention window corresponding to each priority is adjusted to the minimum allowable value.

5. When the quantity of the NACKs received by the network device on all the PUCCH or PUSCH resources is smaller than or equal to P, or when the quantity of the PUCCH or PUSCH resources receiving the NACKs is smaller than or equal to P, the contention window corresponding to each priority is adjusted to the minimum allowable value.

6. When the proportion of the NACKs received by the network device on all the PUCCH or PUSCH resources is smaller than or equal to F %, i.e., when the proportion of the quantity of NACKs received by the network device on all the PUCCH or PUSCH resources to the quantity of receivable NACKs is smaller than or equal to F %, or when the proportion of the quantity of the PUCCH or PUSCH resources receiving the NACKs to the quantity of all the PUCCH or PUSCH resources is smaller than or equal to F %, the contention window corresponding to each priority is adjusted to the minimum allowable value.

Embodiment 2

In the embodiment, the first device is the network device, the first channel is the PDSCH, and the group of receiving terminals feed back the HARQ information by means of the ACK/NACK feedback method. The network device adjusts the contention window corresponding to each priority of the at least one priority, based on the feedback information for the PDSCH transmitted within the reference time unit or the reference time period.

In an implementation, all the terminal devices corresponding to the PDSCH use the feedback method described above in Case 2-1.

The network device adjusts the contention window corresponding to each priority in accordance with at least one of the following 1, 2, 3, 4, 5, or 6.

1. When the quantity of the NACKs received by the network device is greater than or equal to a threshold A, and/or when a quantity of ACKs received by the network device is smaller than or equal to a threshold B, the contention window corresponding to each priority is increased to a next allowable value. Each of A and B is configured by the network, is preconfigured, is predefined, or is dependent on the implementation of the network device. Optionally, A is greater than or equal to 0. For example, A is greater than 0. Optionally, B is greater than or equal to 0. For example, B is greater than 0. Optionally, A or B may be equal to 0. Optionally, A may be or may not be equal to B.

2. When a ratio or a difference between the quantity of the NACKs received by the network device and the quantity of the ACKs received by the network device is greater than or equal to a threshold C, and/or when a ratio or a difference between the quantity of the ACKs received by the network device and the quantity of the NACKs received by the network device is smaller than or equal to a threshold D, the contention window corresponding to each priority is increased to the next allowable value. Each of C and D is configured by the network, is preconfigured, is predefined, or is dependent on the implementation of the network device. Optionally, C may be an integer, a non-integer, a positive number, or a non-positive number. Optionally, D may be an integer, a non-integer, a positive number, or a non-positive number.

3. When a ratio or a difference between received power measured by the network device on the resource receiving the NACK and received power measured by the network device on the resource receiving the ACK is greater than or equal to a threshold E, and/or when a ratio or a difference between the received power measured by the network device on the resource receiving the ACK and the received power measured by the network device on the resource receiving the NACK is smaller than or equal to a threshold F, the contention window corresponding to each priority is increased to the next allowable value. Each of E and F is configured by the network, is preconfigured, is predefined, or is dependent on the implementation of the network device. Optionally, E may be an integer, a non-integer, a positive number, or a non-positive number. Optionally, F may be an integer, a non-integer, a positive number, or a non-positive number. Optionally, the received power includes, but is not limited to, RSRP and/or RSSI.

4. When the quantity of the NACKs received by the network device is smaller than or equal to a threshold G, and/or when the quantity of the ACKs received by the network device is greater than or equal to a threshold H, the contention window corresponding to each priority is adjusted to a minimum allowable value. Each of H and G is configured by the network, is preconfigured, is predefined, or is dependent on the implementation of the network device. Optionally, H is greater than or equal to 0. For example, H is greater than 0. Optionally, G is greater than or equal to 0. For example, G is greater than 0. Optionally, H or G may be equal to 0. Optionally, G may be or may not be equal to H.

5. When the ratio or the difference between the quantity of the NACKs received by the network device and the quantity of the ACKs received by the network device is smaller than or equal to a threshold I, and/or when the ratio or the difference between the quantity of the ACKs received by the network device and the quantity of the NACKs received by the network device is greater than or equal to a threshold J, the contention window corresponding to each priority is adjusted to the minimum allowable value. Optionally, I may be an integer, a non-integer, a positive number, or a non-positive number. Optionally, J may be an integer, a non-integer, a positive number, or a non-positive number.

6. When the ratio or the difference between the received power measured by the network device on the resource receiving the NACK and the received power measured by the network device on the resource receiving the ACK is smaller than or equal to a threshold K, and/or when the ratio or the difference between the received power measured by the network device on the resource receiving the ACK and the received power measured by the network device on the resource receiving the NACK is greater than or equal to a threshold L, the contention window corresponding to each priority is adjusted to the minimum allowable value. Each of K and L is configured by the network, is preconfigured, is predefined, or is dependent on the implementation of the network device. Optionally, K may be an integer, a non-integer, a positive number, or a non-positive number. Optionally, L may be an integer, a non-integer, a positive number, or a non-positive number. Optionally, the received power includes, but is not limited to, RSRP and/or RSSI.

In an implementation, all the terminal devices corresponding to the PDSCH use the feedback method described above in Case 2-2.

The network device adjusts the contention window corresponding to each priority in accordance with at least one of the following 1, 2, 3, 4, 5, or 6.

1. When the quantity of the NACKs received by the network device is greater than or equal to a threshold M, and/or when the quantity of the ACKs received by the network device is smaller than or equal to a threshold O, the contention window corresponding to each priority is increased to a next allowable value. Each of M and O is configured by the network, is preconfigured, is predefined, or is dependent on the implementation of the network device. Optionally, M is greater than or equal to 0. For example, M is greater than 0. Optionally, O is greater than or equal to 0. For example, O is greater than 0.

2. When a ratio or a difference between the quantity of the NACKs received by the network device and the quantity of the ACKs received by the network device is greater than or equal to a threshold N, and/or when a ratio or a difference between the quantity of the ACKs received by the network device and the quantity of the NACKs received by the network device is smaller than or equal to a threshold P, the contention window corresponding to each priority is increased to the next allowable value. Each of N and P is configured by the network, is preconfigured, is predefined, or is dependent on the implementation of the network device. Optionally, N may be an integer, a non-integer, a positive number, or a non-positive number. Optionally, P may be an integer, a non-integer, a positive number, or a non-positive number.

3. When a ratio between the quantity of the NACKs received by the network device and a quantity of receivable ACKs/NACKs is greater than or equal to a threshold Q, and/or when a ratio between the quantity of the ACKs received by the network device and the quantity of the receivable ACKs/NACKs is smaller than or equal to a threshold R, the contention window corresponding to each priority is increased to the next allowable value. Each of Q and R is configured by the network, is preconfigured, is predefined, or is dependent on the implementation of the network device. Optionally, Q may be an integer, a non-integer, a positive number, or a non-positive number. Optionally, R may be an integer, a non-integer, a positive number, or a non-positive number.

4. When the quantity of the NACKs received by the network device is smaller than or equal to a threshold S, and/or when the quantity of the ACKs received by the network device is greater than or equal to a threshold T, the contention window corresponding to each priority is adjusted to a minimum allowable value. Each of S and T is configured by the network, is preconfigured, is predefined, or is dependent on the implementation of the network device. Optionally, S is greater than or equal to 0. For example, S is greater than 0. Optionally, T is greater than or equal to 0. For example, T is greater than 0.

5. When the ratio or the difference between the quantity of the NACKs received by the network device and the quantity of the ACKs received by the network device is smaller than or equal to a threshold U, and/or when the ratio or the difference between the quantity of the ACKs received by the network device and the quantity of the NACKs received by the network device is greater than or equal to a threshold V, the contention window corresponding to each priority is adjusted to the minimum allowable value. Each of U and V is configured by the network, is preconfigured, is predefined, or is dependent on the implementation of the network device. Optionally, U may be an integer, a non-integer, a positive number, or a non-positive number. Optionally, V may be an integer, a non-integer, a positive number, or a non-positive number.

6. When the ratio between the quantity of the NACKs received by the network device and the quantity of the receivable ACKs/NACKs is smaller than or equal to a threshold W, and/or when the ratio between the quantity of the ACKs received by the network device and the quantity of the receivable ACKs/NACKs is greater than or equal to a threshold X, the contention window corresponding to each priority is adjusted to the minimum allowable value. Each of W and X is configured by the network, is preconfigured, is predefined, or is dependent on the implementation of the network device. Optionally, W may be an integer, a non-integer, a positive number, or a non-positive number. Optionally, X may be an integer, a non-integer, a positive number, or a non-positive number.

Figure 10:
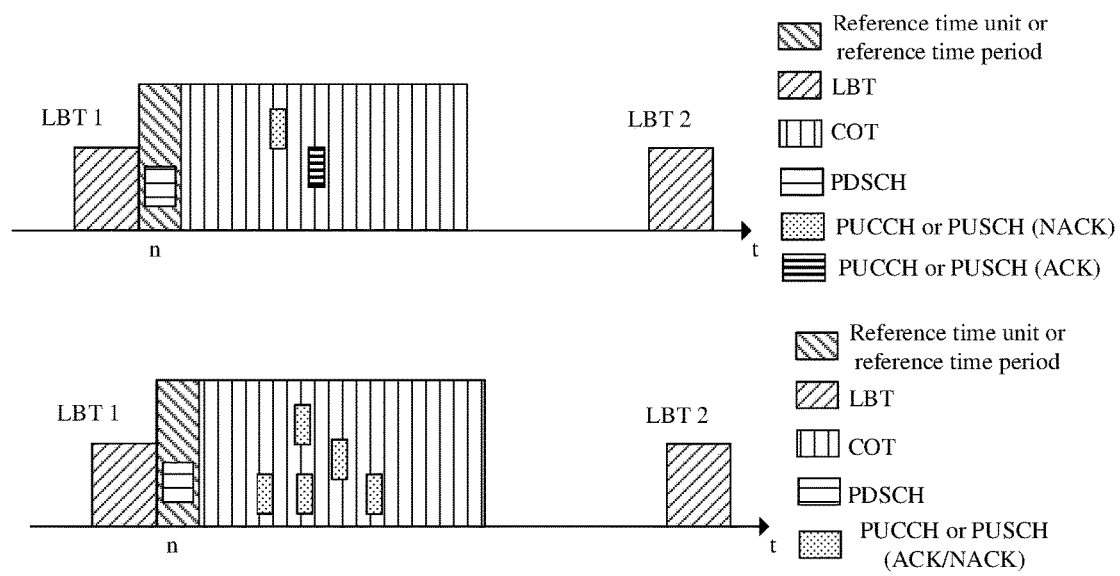

FIG. 10 is a schematic diagram showing feedback information for a first channel according to an embodiment of the present disclosure.

As illustrated in FIG. 10, LBT 2 is type 1 LBT. In LBT 2, the network device adjusts the contention window corresponding to each priority before determining Ninit. The network device determines the reference time unit or the reference time period. For example, the reference time unit is the start time unit of the last channel occupancy of the network device, and the time unit may be the slot or the symbol or the subframe. Or, the reference time unit is the start time unit of the last channel occupancy which satisfies the condition that an HARQ feedback value for the PDSCH transmitted within the reference time unit is available. For example, the reference time period is the reference time period corresponding to the time period of the last channel occupancy of the network device. Or, the reference time period is the reference time period corresponding to the time period of the last channel occupancy which satisfies the condition that an HARQ feedback value for the PDSCH transmitted within the reference time period is available. For the reference time period, e.g., in general, the start point of the reference time period coincides with the start point of the time period of the channel occupancy, and the end point of the reference time period is the end position of the start slot of the transmission of the PDSCH by the network device through the channel occupancy or the end position of the first group of PDSCH transmission opportunities transmitted by the network device through the channel occupancy. The group of PDSCH transmission opportunities mentioned above is defined as a group of consecutive PDSCH transmissions with the interval smaller than x microseconds. For example, in FIG. 10, the network device determines the reference time unit or the reference time period as the time length n.

Based on this, the network device transmits data to the plurality of UEs on the same PDSCH resource within the reference time unit or reference time period n. The transmission mode may be groupcast or multicast or broadcast.

When the above-mentioned plurality of UEs uses the feedback scheme of Case 2-1, e.g., in the upper part of FIG. 10, each of the above-mentioned plurality of UEs feeds back an NACK to the network device on a shared PUCCH or PUSCH resource in the figure in response to a reception failure, and feeds back an ACK to the network device on another shared PUCCH or PUSCH resource in the figure in response to a reception success. The above-mentioned PUCCH or PUSCH resource is scheduled by the network device, or is configured by the network, or is pre-configured. On this basis, adjusting, by the network device, the contention window corresponding to each priority based on the HARQ feedback values corresponding to the groupcast or broadcast PDSCH transmitted within the reference time unit or reference time period n includes one or more of the following 1, 2, 3, 4, 5, or 6.

1. When the quantity of the NACKs received by the network device on PUCCH or PUSCH resources used to receive NACKs is greater than or equal to the threshold A, and/or when a quantity of ACKs received by the network device on PUCCH or PUSCH resources used to receive ACKs is smaller than or equal to the threshold B, the contention window corresponding to each priority is increased to the next allowable value. Each of A and B is configured by the network, is preconfigured, is predefined, or is dependent on the implementation of the network device. Optionally, A is greater than or equal to 0. For example, A is greater than 0. Optionally, B is greater than or equal to 0. For example, B is greater than 0. Optionally, A or B may be equal to 0. Optionally, A may be or may not be equal to B.

2. When a ratio or a difference between the quantity of the NACKs received by the network device on the PUCCH or PUSCH resources used to receive the NACKs and the quantity of the ACKs received by the network device on the PUCCH or PUSCH resources used to receive the ACKs is greater than or equal to the threshold C, and/or when a ratio or a difference between the quantity of the ACKs received by the network device on the PUCCH or PUSCH resources used to receive the ACKs and the quantity of the NACKs received by the network device on the PUCCH or PUSCH resources used to receive the NACKs is smaller than or equal to the threshold D, the contention window corresponding to each priority is increased to the next allowable value. Each of C and D is configured by the network, is preconfigured, is predefined, or is dependent on the implementation of the network device. Optionally, C may be an integer, a non-integer, a positive number, or a non-positive number. Optionally, D may be an integer, a non-integer, a positive number, or a non-positive number.

3. When a ratio or a difference between received power measured by the network device on the PUCCH or PUSCH resource receiving the NACK and received power measured by the network device on the PUCCH or PUSCH resource receiving the ACK is greater than or equal to the threshold E, and/or when a ratio or a difference between the received power measured by the network device on the PUCCH or PUSCH resource receiving the ACK and the received power measured by the network device on the PUCCH or PUSCH resource receiving the NACK is smaller than or equal to the threshold F, the contention window corresponding to each priority is increased to the next allowable value. Each of E and F is configured by the network, is preconfigured, is predefined, or is dependent on the implementation of the network device. Optionally, E may be an integer, a non-integer, a positive number, or a non-positive number. Optionally, F may be an integer, a non-integer, a positive number, or a non-positive number. Optionally, the received power includes, but is not limited to, RSRP and/or RSSI.

4. When the quantity of the NACKs received by the network device on the PUCCH or PUSCH resources used to receive the NACKs is smaller than or equal to the threshold G, and/or when the quantity of the ACKs received by the network device on the PUCCH or PUSCH resources used to receive the ACKs is greater than or equal to the threshold H, the contention window corresponding to each priority is adjusted to the minimum allowable value. Each of H and G is configured by the network, is preconfigured, is predefined, or is dependent on the implementation of the network device. Optionally, H is greater than or equal to 0. For example, H is greater than 0. Optionally, G is greater than or equal to 0. For example, G is greater than 0. Optionally, H or G may be equal to 0. Optionally, G may be or may not be equal to H.

5. When the ratio or the difference between the quantity of the NACKs received by the network device on the PUCCH or PUSCH resources used to receive the NACKs and the quantity of the ACKs received by the network device on the PUCCH or PUSCH resources used to receive the ACKs is smaller than or equal to the threshold I, and/or when the ratio or the difference between the quantity of the ACKs received by the network device on the PUCCH or PUSCH resources used to receive the ACKs and the quantity of the NACKs received by the network device on the PUCCH or PUSCH resources used to receive the NACKs is greater than or equal to the threshold J, the contention window corresponding to each priority is adjusted to the minimum allowable value. Optionally, I may be an integer, a non-integer, a positive number, or a non-positive number. Optionally, J may be an integer, a non-integer, a positive number, or a non-positive number.

6. When the ratio or the difference between the received power measured by the network device on the PUCCH or PUSCH resource receiving the NACK and the received power measured by the network device on the PUCCH or PUSCH resource receiving the ACK is smaller than or equal to the threshold K, and/or when the ratio or the difference between the received power measured by the network device on the PUCCH or PUSCH resource receiving the ACK and the received power measured by the network device on the PUCCH or PUSCH resource receiving the NACK is greater than or equal to the threshold L, the contention window corresponding to each priority is adjusted to the minimum allowable value. Each of K and L is configured by the network, is preconfigured, is predefined, or is dependent on the implementation of the network device. Optionally, K may be an integer, a non-integer, a positive number, or a non-positive number. Optionally, L may be an integer, a non-integer, a positive number, or a non-positive number. Optionally, the received power includes, but is not limited to, RSRP and/or RSSI.

When the above-mentioned plurality of UEs uses the feedback scheme of Case 2-2, e.g., in the lower part of FIG. 10, each of the above-mentioned plurality of UEs feeds back an NACK to the network device on its respective independent PUCCH or PUSCH resource in response to a reception failure, and feeds back an ACK to the network device on its respective independent PUCCH or PUSCH resource in response to a reception success. In other words, each of the above-mentioned plurality of UEs corresponds to one independent PUCCH or PUSCH resource on which the UE may feed back, based on a decoding success or failure, an ACK or NACK to the network device. The above-mentioned PUCCH or PUSCH resource is scheduled by the network device, or is configured by the network, or is pre-configured. On this basis, adjusting, by the network device, the contention window corresponding to each priority based on the HARQ feedback values corresponding to the groupcast or broadcast PDSCH transmitted within the reference time unit or reference time period n includes one or more of the following 1, 2, 3, 4, 5, or 6.

1. When the quantity of the NACKs received by the network device on all the PUCCH or PUSCH resources is greater than or equal to the threshold M (or when a quantity of PUCCH or PUSCH resources on which the network device receives the NACKs is greater than or equal to the threshold M), and/or when the quantity of the ACKs received by the network device on all the PUCCH or PUSCH resources is smaller than or equal to the threshold O (or when a quantity of PUCCH or PUSCH resources on which the network device receives the ACKs is smaller than or equal to the threshold O), the contention window corresponding to each priority is increased to the next allowable value. Each of M and O is configured by the network, is preconfigured, is predefined, or is dependent on the implementation of the network device. Optionally, M is greater than or equal to 0. For example, M is greater than 0. Optionally, O is greater than or equal to 0. For example, O is greater than 0.

2. When a ratio or a difference between the quantity of the NACKs received by the network device on all the PUCCH or PUSCH resources (or the quantity of the PUCCH or PUSCH resources on which the network device receives the NACKs) and the quantity of the ACKs received by the network device on all the PUCCH or PUSCH resources (or the quantity of the PUCCH or PUSCH resources on which the network device receives the ACKs) is greater than or equal to the threshold N, and/or when a ratio or a difference between the quantity of the ACKs received by the network device on all the PUCCH or PUSCH resources (or the quantity of the PUCCH or PUSCH resources on which the network device receives the ACKs) and the quantity of the NACKs received by the network device on all the PUCCH or PUSCH resources (or the quantity of the PUCCH or PUSCH resources on which the network device receives the NACKs) is smaller than or equal to the threshold P, the contention window corresponding to each priority is increased to the next allowable value. Each of N and P is configured by the network, is preconfigured, is predefined, or is dependent on the implementation of the network device. Optionally, N may be an integer, a non-integer, a positive number, or a non-positive number. Optionally, P may be an integer, a non-integer, a positive number, or a non-positive number.

3. When a ratio between the quantity of the NACKs received by the network device on all the PUCCH or PUSCH resources (or, the quantity of the PUCCH or PUSCH resources on which the network device receives the NACKs) and a quantity of receivable ACKs/NACKs (or a quantity of all corresponding PUCCH or PUSCH resources) is greater than or equal to the threshold Q, and/or when a ratio between the quantity of the ACKs received by the network device on all the PUCCH or PUSCH resources (or the quantity of the PUCCH or PUSCH resources on which the network device receives the ACKs) and the quantity of the receivable ACKs/NACKs (or the quantity of all the corresponding PUCCH or PUSCH resources) is smaller than or equal to the threshold R, the contention window corresponding to each priority is increased to the next allowable value. Each of Q and R is configured by the network, is preconfigured, is predefined, or is dependent on the implementation of the network device. Optionally, Q may be an integer, a non-integer, a positive number, or a non-positive number. Optionally, R may be an integer, a non-integer, a positive number, or a non-positive number.

4. When the quantity of the NACKs received by the network device on all the PUCCH or PUSCH resources (or the quantity of the PUCCH or PUSCH resources on which the network device receives the NACKs) is smaller than or equal to the threshold S, and/or when the quantity of the ACKs received by the network device on all the PUCCH or PUSCH resources (or the quantity of the PUCCH or PUSCH resources on which the network device receives the ACKs) is greater than or equal to the threshold T, the contention window corresponding to each priority is adjusted to the minimum allowable value. Each of S and T is configured by the network, is preconfigured, is predefined, or is dependent on the implementation of the network device. Optionally, S is greater than or equal to 0. For example, S is greater than 0. Optionally, T is greater than or equal to 0. For example, T is greater than 0.

5. When the ratio or the difference between the quantity of the NACKs received by the network device on all the PUCCH or PUSCH resources (or the quantity of the PUCCH or PUSCH resources on which the network device receives the NACKs) and the quantity of the ACKs received by the network device on all the PUCCH or PUSCH resources (or the quantity of the PUCCH or PUSCH resources on which the network device receives the ACKs) is smaller than or equal to the threshold U, and/or when the ratio or the difference between the quantity of the ACKs received by the network device on all the PUCCH or PUSCH resources (or the quantity of the PUCCH or PUSCH resources on which the network device receives the ACKs) and the quantity of the NACKs received by the network device on all the PUCCH or PUSCH resources (or the quantity of the PUCCH or PUSCH resources on which the network device receives the NACKs) is greater than or equal to the threshold V, the contention window corresponding to each priority is adjusted to the minimum allowable value. Each of U and V is configured by the network, is preconfigured, is predefined, or is dependent on the implementation of the network device. Optionally, U may be an integer, a non-integer, a positive number, or a non-positive number. Optionally, V may be an integer, a non-integer, a positive number, or a non-positive number.

6. When the ratio between the quantity of the NACKs received by the network device on all the PUCCH or PUSCH resources (or, the quantity of the PUCCH or PUSCH resources on which the network device receives the NACKs) and the quantity of the receivable ACKs/NACKs (or the quantity of all the corresponding PUCCH or PUSCH resources) is smaller than or equal to the threshold W, and/or when the ratio between the quantity of the ACKs received by the network device on all the PUCCH or PUSCH resources (or the quantity of the PUCCH or PUSCH resources on which the network device receives the ACKs) and the quantity of the receivable ACKs/NACKs (or the quantity of all the corresponding PUCCH or PUSCH resources) is greater than or equal to the threshold X, the contention window corresponding to each priority is adjusted to the minimum allowable value. Each of W and X is configured by the network, is preconfigured, is predefined, or is dependent on the implementation of the network device. Optionally, W may be an integer, a non-integer, a positive number, or a non-positive number. Optionally, X may be an integer, a non-integer, a positive number, or a non-positive number.

Embodiment 3

In the embodiment, the first device is the network device, the first channel is the PDSCH, and the PDSCH is used for blind retransmission. The network device adjusts the contention window corresponding to each priority of the at least one priority, based on the feedback information for the PDSCH transmitted within the reference time unit or the reference time period (i.e., a case of no feedback).

The network device adjusts, based on the contention window used for the last channel occupancy or based on the received power measurement result, the contention window corresponding to each priority in accordance with at least one of the following methods 1, 2, or 3.

1. The network device adjusts the contention window corresponding to each priority to the contention window used or adjusted for the last channel occupancy.

2. When a channel of a time length Y is monitored and monitored energy or power is greater than or equal to a threshold Z, the contention window corresponding to each priority is increased to a next allowable value. Y is configured by the network, is preconfigured, is predefined, or is dependent on the implementation of the first device. Optionally, Y is a monitoring slot Tsl, or a monitoring time length Td or Tf determined based on Tsl.

3. When the channel of the time length Y is monitored and the monitored energy or power is smaller than or equal to the threshold Z, the contention window corresponding to each priority is adjusted to a minimum allowable value.

It should be understood that, the contention window adjusted for the last channel occupancy involved in the embodiments of the present disclosure can be interpreted as the adjusted contention window for the last channel occupancy or the adjusted contention window used for the last channel occupancy.

Figure 11:
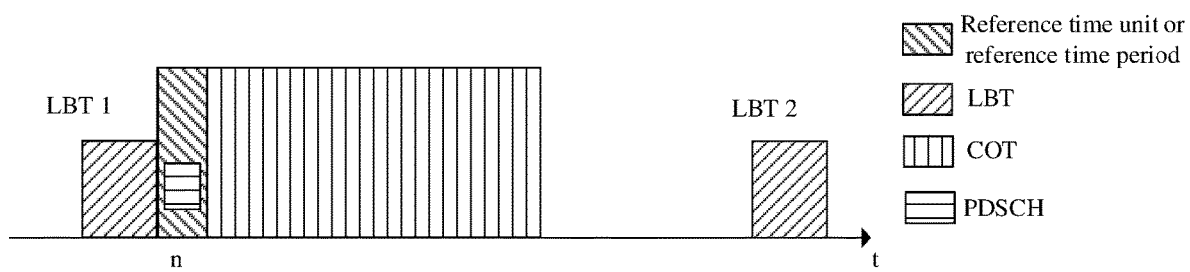

FIG. 11 is a schematic diagram showing feedback information for a first channel according to an embodiment of the present disclosure.

As illustrated in FIG. 11, LBT 2 is type 1 LBT. In LBT 2, the network device adjusts the contention window corresponding to each priority before determining Ninit. The network device determines the reference time unit or the reference time period. For example, the reference time unit is the start time unit of the last channel occupancy of the network device, and the time unit may be the slot or the symbol or the subframe. Or, the reference time unit is the start time unit of the last channel occupancy which satisfies the condition that an HARQ feedback value for the PDSCH transmitted within the reference time unit is available. For example, the reference time period is the reference time period corresponding to the time period of the last channel occupancy of the network device. Or, the reference time period is the reference time period corresponding to the time period of the last channel occupancy which satisfies the condition that an HARQ feedback value for the PDSCH transmitted within the reference time period is available. For the reference time period, e.g., in general, the start point of the reference time period coincides with the start point of the time period of the channel occupancy, and the end point of the reference time period is the end position of the start slot of the transmission of the PDSCH by the network device through the channel occupancy or the end position of the first group of PDSCH transmission opportunities transmitted by the network device through the channel occupancy. The group of PDSCH transmission opportunities mentioned above is defined as a group of consecutive PDSCH transmissions with the interval smaller than x microseconds. For example, in FIG. 11, the network device determines the reference time unit or the reference time period as the time length n.

Based on this, the network device transmits data to the plurality of UEs on the same PDSCH resource within the reference time unit or reference time period n. The transmission mode may be groupcast or multicast or broadcast.

In a case where the PDSCH is used for the blind retransmission or where the PDSCH corresponds to no HARQ feedback value, in an implementation, the network device adjusts the contention window corresponding to each priority, based on a size of the contention window corresponding to each priority used or adjusted for a last channel access or occupancy. For example, in FIG. 11, before determining Ninit in LBT 2, the network device adjusts the contention window corresponding to each priority, based on the contention window corresponding to each priority used or adjusted for the last channel occupancy or last LBT or last type 1 LBT (e.g., LBT 1). For example, the network device adjusts the contention window corresponding to each priority to the contention window of each priority used or adjusted for the last channel occupancy or the last LBT or the last type 1 LBT (e.g., LBT 1). In another implementation, the network device monitors the channel of the time length Y. When the network device monitors the channel of the time length Y and the monitored energy or power is greater than or equal to the threshold Z, the contention window corresponding to each priority is increased to the next allowable value. Y is configured by the network, is preconfigured, is predefined, or is dependent on the implementation of the first device. Optionally, Y is the monitoring slot Tsl, or the monitoring time length Td or Tf determined based on Tsl. In another implementation, when the network device monitors the channel of the time length Y and the monitored energy or power is smaller than or equal to the threshold Z, the contention window corresponding to each priority is adjusted to the minimum allowable value.

The above Embodiment 1 to Embodiment 3 are applications for downlink transmission of the network device in NR-U. That is, the network device adjusts the contention window based on the feedback information for the broadcast or groupcast PDSCH. The above embodiments can also be used for sidelink transmission of the UE in SL-U. Solutions for adjusting the contention window based on feedback information for a broadcast or groupcast PSSCH during sidelink transmission of the terminal device are described below in conjunction with Embodiment 4 to Embodiment 6.

Embodiment 4

In the embodiment, the first device is the terminal device, the first channel is the PSSCH, and the group of receiving terminals feed back the HARQ information by means of the NACK-Only feedback method. The terminal device adjusts the contention window corresponding to each priority of the at least one priority, based on feedback information for the PSSCH transmitted within the reference time unit or the reference time period.

In an implementation, all terminal devices corresponding to the PSSCH use the feedback method described above in Case 1-1.

The terminal device adjusts the contention window corresponding to each priority in accordance with at least one of the following 1, 2, 3, 4, 5, or 6.

1. When an NACK is received by the terminal device, the contention window corresponding to each priority is increased to a next allowable value.

2. When a quantity of NACKs received by the terminal device is greater than or equal to P, the contention window corresponding to each priority is increased to the next allowable value. P is configured by a network, is preconfigured, is predefined, or is dependent on an implementation of the terminal device. Optionally, P is greater than or equal to 0. For example, P is greater than 0.

3. When received power measured by the terminal device on a resource receiving the NACK is greater than or equal to a threshold H, the contention window corresponding to each priority is increased to the next allowable value. H is configured by the network, is preconfigured, is predefined, or is dependent on the implementation of the terminal device. Optionally, H may be an integer or a non-integer. Optionally, the received power includes, but is not limited to, RSRP and/or RSSI.

4. When no NACK is received by the terminal device, the contention window corresponding to each priority is adjusted to a minimum allowable value.

5. When the quantity of the NACKs received by the terminal device is smaller than or equal to P, the contention window corresponding to each priority is adjusted to the minimum allowable value.

6. When the received power measured by the terminal device on the resource receiving the NACK is smaller than or equal to the threshold H, the contention window corresponding to each priority is adjusted to the minimum allowable value.

In another implementation, all the terminal devices corresponding to the PSSCH use the feedback method described above in Case 1-2.

The terminal device adjusts the contention window corresponding to each priority in accordance with at least one of the following 1, 2, 3, 4, 5, or 6.

1. When an NACK is received by the terminal device, the contention window corresponding to each priority is increased to a next allowable value.

2. When a quantity of NACKs received by the terminal device is greater than or equal to P, the contention window corresponding to each priority is increased to the next allowable value. P is configured by a network, is preconfigured, is predefined, or is dependent on an implementation of the terminal device. Optionally, P is greater than or equal to 0. For example, P is greater than 0.

3. When a proportion of the NACKs received by the terminal device is greater than or equal to F %, the contention window corresponding to each priority is increased to the next allowable value. F is configured by the network, is preconfigured, is predefined, or is dependent on the implementation of the terminal device. Optionally, F is greater than or equal to 0. For example, F is greater than 0. Optionally, F may be an integer or a non-integer.

4. When no NACK is received by the terminal device, the contention window corresponding to each priority is adjusted to a minimum allowable value.

5. When the quantity of the NACKs received by the terminal device is smaller than or equal to P, the contention window corresponding to each priority is adjusted to the minimum allowable value.

6. When the proportion of the NACKs received by the terminal device is smaller than or equal to F %, the contention window corresponding to each priority is adjusted to the minimum allowable value.

Figure 12:
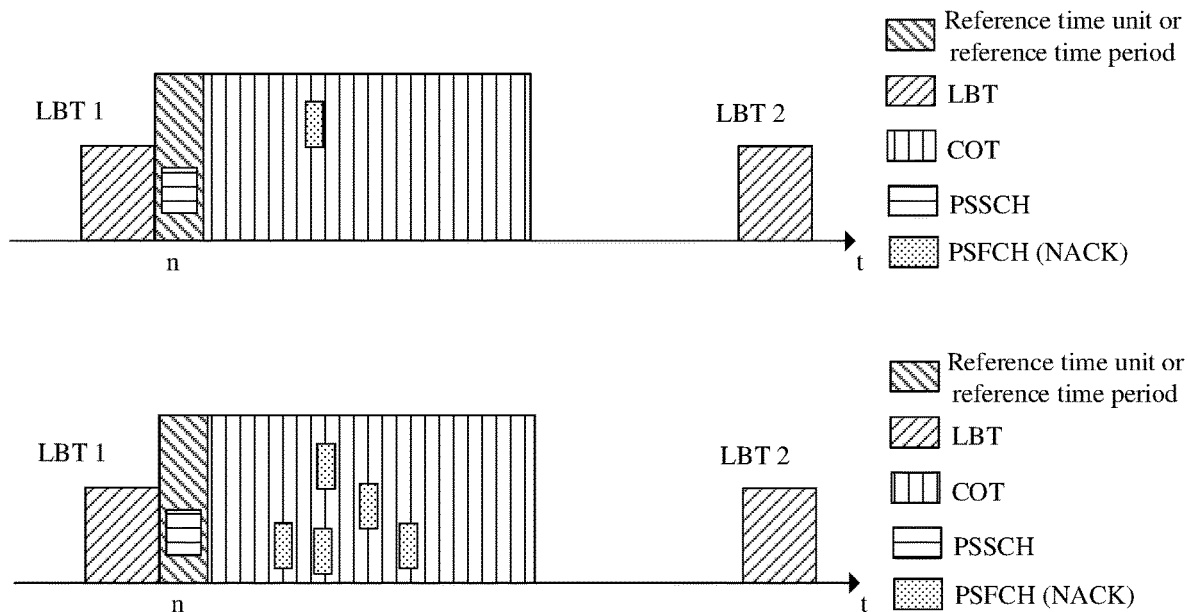

FIG. 12 is a schematic diagram showing feedback information for a first channel according to an embodiment of the present disclosure.

As illustrated in FIG. 12, LBT 2 is type 1 LBT. In LBT 2, UE 1 adjusts the contention window corresponding to each priority before determining Ninit. UE 1 determines the reference time unit or the reference time period. For example, the reference time unit is a start time unit of a last channel occupancy of UE 1, and the time unit may be a slot or a symbol or a subframe. Or, the reference time unit is the start time unit of the last channel occupancy which satisfies the condition that an HARQ feedback value for the PSSCH transmitted within the reference time unit is available. For example, the reference time period is a reference time period corresponding to a time period of the last channel occupancy of UE 1. Or, the reference time period is a reference time period corresponding to the time period of the last channel occupancy which satisfies the condition that an HARQ feedback value for the PSSCH transmitted within the reference time period is available. For the reference time period, e.g., in general, the start point of the reference time period coincides with the start point of the time period of the channel occupancy, and the end point of the reference time period is an end position of a start slot of transmission of the PSSCH by UE1 through channel occupancy or an end position of a first group of PSSCH transmission opportunities transmitted by UE 1 through the channel occupancy. The group of PSSCH transmission opportunities mentioned above is defined as a group of consecutive PSSCH transmissions with an interval smaller than x microseconds. For example, in FIG. 12, UE 1 determines the reference time unit or the reference time period as the time length n.

Based on this, UE 1 transmits data to a plurality of UEs on a same PSSCH resource within the reference time unit or reference time period n. The transmission mode may be groupcast or multicast or broadcast.

When the above-mentioned plurality of UEs uses the feedback scheme of Case 1-1, e.g., in the upper part of FIG. 12, each of the above-mentioned plurality of UEs feeds back an NACK to UE 1 on a shared PSFCH resource in the figure only in response to a reception failure. The above-mentioned PSFCH resource is determined based on a position of a time frequency resource transmitted by the PSSCH, or is configured by the network, or is pre-configured. In this case, adjusting, by UE 1, the contention window corresponding to each priority based on HARQ feedback values corresponding to a groupcast or broadcast PSSCH transmitted within the reference time unit or reference time period n includes one or more of the following 1, 2, 3, 4, 5, or 6.

1. When an NACK is received by UE 1 on the PSFCH resource, the contention window corresponding to each priority is increased to the next allowable value.

2. When a quantity of NACKs received by UE 1 on PSFCH resources is greater than or equal to P, or when NACKs are received by UE 1 on at least P PSFCH resources, the contention window corresponding to each priority is increased to the next allowable value. P is configured by the network, is preconfigured, is predefined, or is dependent on an implementation of UE 1. Optionally, P is greater than or equal to 0. For example, P is greater than 0.

3. When received power measured by UE 1 on the PSFCH resource is greater than or equal to the threshold H, the contention window corresponding to each priority is increased to the next allowable value. H is configured by the network, is preconfigured, is predefined, or is dependent on the implementation of UE 1. Optionally, H may be an integer or a non-integer. Optionally, the received power includes, but is not limited to, RSRP and/or RSSI.

4. When no NACK is received by UE 1 on the PSFCH resource, the contention window corresponding to each priority is adjusted to the minimum allowable value.

5. When the quantity of the NACKs received by UE 1 on the PSFCH resources is smaller than or equal to P, or when a quantity of the PSFCH resources receiving the NACKs is smaller than or equal to P, the contention window corresponding to each priority is adjusted to the minimum allowable value.

6. When the received power measured by UE 1 on the PSFCH resource is smaller than or equal to the threshold H, the contention window corresponding to each priority is adjusted to the minimum allowable value.

When the above-mentioned plurality of UEs uses the feedback scheme of Case 1-2, e.g., in the lower part of FIG. 12, each of the above-mentioned plurality of UEs feeds back an NACK to UE 1 on its respective independent PSFCH resource only in response to a reception failure. Or, each of the above-mentioned plurality of UEs corresponds to one independent PSFCH resource on which an NACK is fed back in response to a decoding failure. The above-mentioned PSFCH resource is determined based on the time frequency resource position of the PSSCH transmission, or is configured by the network, or is pre-configured. In this case, adjusting, by UE 1, the contention window corresponding to each priority based on the HARQ feedback values corresponding to the groupcast or broadcast PSSCH transmitted within the reference time unit or reference time period n includes one or more of the following 1, 2, 3, 4, 5, or 6.

1. When an NACK is received by UE 1 on any of all PSFCH resources, the contention window corresponding to each priority is increased to the next allowable value.

2. When a quantity of NACKs received by UE 1 on all the PSFCH resources is greater than or equal to P, or when NACKs are received by UE 1 on at least P PSFCH resources, the contention window corresponding to each priority is increased to the next allowable value. P is configured by the network, is preconfigured, is predefined, or is dependent on the implementation of UE 1. Optionally, P is greater than or equal to 0. For example, P is greater than 0.

3. When a proportion of the NACKs received by UE 1 on all the PSFCH resources is greater than or equal to F %, i.e., when a proportion of the quantity of NACKs received by UE 1 on all the PSFCH resources to a quantity of receivable NACKs is greater than or equal to F %, or when a proportion of a quantity of PSFCH resources receiving the NACKs to a quantity of all the PSFCH resources is greater than or equal to F %, the contention window corresponding to each priority is increased to the next allowable value. F is configured by the network, is preconfigured, is predefined, or is dependent on the implementation of UE 1. Optionally, F is greater than or equal to 0. For example, F is greater than 0. Optionally, F may be an integer or a non-integer.

4. When no NACK is received by UE 1 on all the PSFCH resources, the contention window corresponding to each priority is adjusted to the minimum allowable value.

5. When the quantity of the NACKs received by UE 1 on all the PSFCH resources is smaller than or equal to P, or when the quantity of the PSFCH resources receiving the NACKs is smaller than or equal to P, the contention window corresponding to each priority is adjusted to the minimum allowable value.

6. When the proportion of the NACKs received by UE 1 on all the PSFCH resources is smaller than or equal to F %, i.e., when the proportion of the quantity of NACKs received by UE 1 on all the PSFCH resources to the quantity of receivable NACKs is smaller than or equal to F %, or when the proportion of the quantity of the PSFCH resources receiving the NACKs to the quantity of all the PSFCH resources is smaller than or equal to F %, the contention window corresponding to each priority is adjusted to the minimum allowable value.

Embodiment 5

In the embodiment, the first device is the terminal device, the first channel is the PSSCH, and the group of receiving terminals feed back the HARQ information by means of the ACK/NACK feedback method. The terminal device adjusts the contention window corresponding to each priority of the at least one priority, based on the feedback information for the PSSCH transmitted within the reference time unit or the reference time period.

In an implementation, all the terminal devices corresponding to the PSSCH use the feedback method described above in Case 2-1.

The terminal device adjusts the contention window corresponding to each priority in accordance with at least one of the following 1, 2, 3, 4, 5, or 6.

1. When the quantity of the NACKs received by the terminal device is greater than or equal to a threshold A, and/or when a quantity of ACKs received by the terminal device is smaller than or equal to a threshold B, the contention window corresponding to each priority is increased to a next allowable value. Each of A and B is configured by the network, is preconfigured, is predefined, or is dependent on the implementation of the terminal device. Optionally, A is greater than or equal to 0. For example, A is greater than 0. Optionally, B is greater than or equal to 0. For example, B is greater than 0. Optionally, A or B may be equal to 0. Optionally, A may be or may not be equal to B.

2. When a ratio or a difference between the quantity of the NACKs received by the terminal device and the quantity of the ACKs received by the terminal device is greater than or equal to a threshold C, and/or when a ratio or a difference between the quantity of the ACKs received by the terminal device and the quantity of the NACKs received by the terminal device is smaller than or equal to a threshold D, the contention window corresponding to each priority is increased to the next allowable value. Each of C and D is configured by the network, is preconfigured, is predefined, or is dependent on the implementation of the terminal device. Optionally, C may be an integer, a non-integer, a positive number, or a non-positive number. Optionally, D may be an integer, a non-integer, a positive number, or a non-positive number.

3. When a ratio or a difference between received power measured by the terminal device on the resource receiving the NACK and received power measured by the terminal device on the resource receiving the ACK is greater than or equal to a threshold E, and/or when a ratio or a difference between the received power measured by the terminal device on the resource receiving the ACK and the received power measured by the terminal device on the resource receiving the NACK is smaller than or equal to a threshold F, the contention window corresponding to each priority is increased to the next allowable value. Each of E and F is configured by the network, is preconfigured, is predefined, or is dependent on the implementation of the terminal device. Optionally, E may be an integer, a non-integer, a positive number, or a non-positive number. Optionally, F may be an integer, a non-integer, a positive number, or a non-positive number. Optionally, the received power includes, but is not limited to, RSRP and/or RSSI.

4. When the quantity of the NACKs received by the terminal device is smaller than or equal to a threshold G, and/or when the quantity of the ACKs received by the terminal device is greater than or equal to a threshold H, the contention window corresponding to each priority is adjusted to a minimum allowable value. Each of H and G is configured by the network, is preconfigured, is predefined, or is dependent on the implementation of the terminal device. Optionally, H is greater than or equal to 0. For example, H is greater than 0. Optionally, G is greater than or equal to 0. For example, G is greater than 0. Optionally, H or G may be equal to 0. Optionally, G may be or may not be equal to H.

5. When the ratio or the difference between the quantity of the NACKs received by the terminal device and the quantity of the ACKs received by the terminal device is smaller than or equal to a threshold I, and/or when the ratio or the difference between the quantity of the ACKs received by the terminal device and the quantity of the NACKs received by the terminal device is greater than or equal to a threshold J, the contention window corresponding to each priority is adjusted to the minimum allowable value. Optionally, I may be an integer, a non-integer, a positive number, or a non-positive number. Optionally, J may be an integer, a non-integer, a positive number, or a non-positive number.

6. When the ratio or the difference between the received power measured by the terminal device on the resource receiving the NACK and the received power measured by the terminal device on the resource receiving the ACK is smaller than or equal to a threshold K, and/or when the ratio or the difference between the received power measured by the terminal device on the resource receiving the ACK and the received power measured by the terminal device on the resource receiving the NACK is greater than or equal to a threshold L, the contention window corresponding to each priority is adjusted to the minimum allowable value. Each of K and L is configured by the network, is preconfigured, is predefined, or is dependent on the implementation of the terminal device. Optionally, K may be an integer, a non-integer, a positive number, or a non-positive number. Optionally, L may be an integer, a non-integer, a positive number, or a non-positive number. Optionally, the received power includes, but is not limited to, RSRP and/or RSSI.

In an implementation, all the terminal devices corresponding to the PSSCH use the feedback method described above in Case 2-2.

The terminal device adjusts the contention window corresponding to each priority in accordance with at least one of the following 1, 2, 3, 4, 5, or 6.

1. When the quantity of the NACKs received by the terminal device is greater than or equal to a threshold M, and/or when the quantity of the ACKs received by the terminal device is smaller than or equal to a threshold O, the contention window corresponding to each priority is increased to a next allowable value. Each of M and O is configured by the network, is preconfigured, is predefined, or is dependent on the implementation of the terminal device. Optionally, M is greater than or equal to 0. For example, M is greater than 0. Optionally, O is greater than or equal to 0. For example, O is greater than 0.

2. When a ratio or a difference between the quantity of the NACKs received by the terminal device and the quantity of the ACKs received by the terminal device is greater than or equal to a threshold N, and/or when a ratio or a difference between the quantity of the ACKs received by the terminal device and the quantity of the NACKs received by the terminal device is smaller than or equal to a threshold P, the contention window corresponding to each priority is increased to the next allowable value. Each of N and P is configured by the network, is preconfigured, is predefined, or is dependent on the implementation of the terminal device. Optionally, N may be an integer, a non-integer, a positive number, or a non-positive number. Optionally, P may be an integer, a non-integer, a positive number, or a non-positive number.

3. When a ratio between the quantity of the NACKs received by the terminal device and a quantity of receivable ACKs/NACKs is greater than or equal to a threshold Q, and/or when a ratio between the quantity of the ACKs received by the terminal device and the quantity of the receivable ACKs/NACKs is smaller than or equal to a threshold R, the contention window corresponding to each priority is increased to the next allowable value. Each of Q and R is configured by the network, is preconfigured, is predefined, or is dependent on the implementation of the terminal device. Optionally, Q may be an integer, a non-integer, a positive number, or a non-positive number. Optionally, R may be an integer, a non-integer, a positive number, or a non-positive number.

4. When the quantity of the NACKs received by the terminal device is smaller than or equal to a threshold S, and/or when the quantity of the ACKs received by the terminal device is greater than or equal to a threshold T, the contention window corresponding to each priority is adjusted to a minimum allowable value. Each of S and T is configured by the network, is preconfigured, is predefined, or is dependent on the implementation of the terminal device. Optionally, S is greater than or equal to 0. For example, S is greater than 0. Optionally, T is greater than or equal to 0. For example, T is greater than 0.

5. When the ratio or the difference between the quantity of the NACKs received by the terminal device and the quantity of the ACKs received by the terminal device is smaller than or equal to a threshold U, and/or when the ratio or the difference between the quantity of the ACKs received by the terminal device and the quantity of the NACKs received by the terminal device is greater than or equal to a threshold V, the contention window corresponding to each priority is adjusted to the minimum allowable value. Each of U and V is configured by the network, is preconfigured, is predefined, or is dependent on the implementation of the terminal device. Optionally, U may be an integer, a non-integer, a positive number, or a non-positive number. Optionally, V may be an integer, a non-integer, a positive number, or a non-positive number.

6. When the ratio between the quantity of the NACKs received by the terminal device and the quantity of the receivable ACKs/NACKs is smaller than or equal to a threshold W, and/or when the ratio between the quantity of the ACKs received by the terminal device and the quantity of the receivable ACKs/NACKs is greater than or equal to a threshold X, the contention window corresponding to each priority is adjusted to the minimum allowable value. Each of W and X is configured by the network, is preconfigured, is predefined, or is dependent on the implementation of the terminal device. Optionally, W may be an integer, a non-integer, a positive number, or a non-positive number. Optionally, X may be an integer, a non-integer, a positive number, or a non-positive number.

Figure 13:
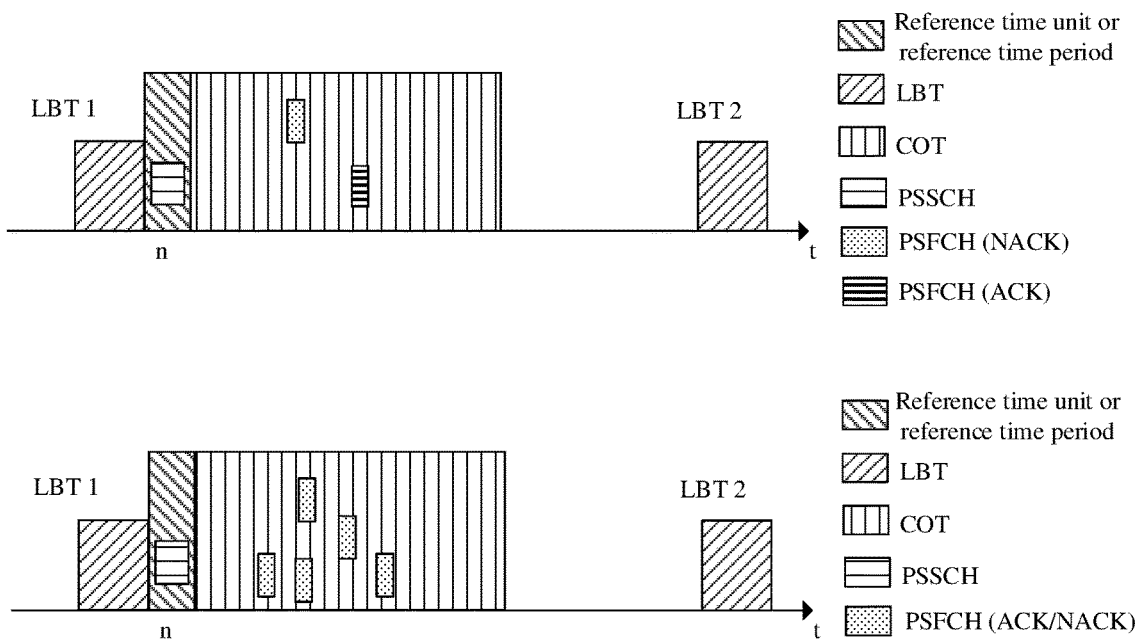

FIG. 13 is a schematic diagram showing feedback information for a first channel according to an embodiment of the present disclosure.

As illustrated in FIG. 13, LBT 2 is type 1 LBT. In LBT 2, UE 1 adjusts the contention window corresponding to each priority before determining Ninit. UE 1 determines the reference time unit or the reference time period. For example, the reference time unit is the start time unit of the last channel occupancy of UE 1, and the time unit may be the slot or the symbol or the subframe. Or, the reference time unit is the start time unit of the last channel occupancy which satisfies the condition that an HARQ feedback value for the PSSCH transmitted within the reference time unit is available. For example, the reference time period is the reference time period corresponding to the time period of the last channel occupancy of UE 1. Or, the reference time period is the reference time period corresponding to the time period of the last channel occupancy which satisfies the condition that an HARQ feedback value for the PSSCH transmitted within the reference time period is available. For the reference time period, e.g., in general, the start point of the reference time period coincides with the start point of the time period of the channel occupancy, and the end point of the reference time period is the end position of the start slot of the transmission of the PSSCH by UE1 through the channel occupancy of UE 1 or the end position of the first group of PSSCH transmission opportunities transmitted by UE 1 through the channel occupancy. The group of PSSCH transmission opportunities mentioned above is defined as a group of consecutive PSSCH transmissions with the interval smaller than x microseconds. For example, in FIG. 13, UE 1 determines the reference time unit or the reference time period as the time length n.

Based on this, UE 1 transmits data to the plurality of UEs on the same PSSCH resource within the reference time unit or reference time period n. The transmission mode may be groupcast or multicast or broadcast.

When the above-mentioned plurality of UEs uses the feedback scheme of Case 2-1, e.g., in the upper part of FIG. 13, each of the above-mentioned plurality of UEs feeds back an NACK to UE 1 on a shared PSFCH resource in the figure in response to a reception failure, and feeds back an ACK to UE 1 on another shared PSFCH resource in the figure in response to a reception success. The above-mentioned PSFCH resource is determined based on the time frequency resource position of the PSSCH transmission, or is configured by the network, or is pre-configured. On this basis, adjusting, by UE 1, the contention window corresponding to each priority based on the HARQ feedback values corresponding to the groupcast or broadcast PSSCH transmitted within the reference time unit or reference time period n includes one or more of the following 1, 2, 3, 4, 5, or 6.

1. When the quantity of the NACKs received by UE 1 on PSFCH resources used to receive NACKs is greater than or equal to the threshold A, and/or when a quantity of ACKs received by UE 1 on PSFCH resources used to receive ACKs is smaller than or equal to the threshold B, the contention window corresponding to each priority is increased to the next allowable value. Each of A and B is configured by the network, is preconfigured, is predefined, or is dependent on the implementation of UE 1. Optionally, A is greater than or equal to 0. For example, A is greater than 0. Optionally, B is greater than or equal to 0. For example, B is greater than 0. Optionally, A or B may be equal to 0. Optionally, A may be or may not be equal to B.

2. When a ratio or a difference between the quantity of the NACKs received by UE 1 on the PSFCH resources used to receive the NACKs and the quantity of the ACKs received by UE 1 on the PSFCH resources used to receive the ACKs is greater than or equal to the threshold C, and/or when a ratio or a difference between the quantity of the ACKs received by UE 1 on the PSFCH resources used to receive the ACKs and the quantity of the NACKs received by UE 1 on the PSFCH resources used to receive the NACKs is smaller than or equal to the threshold D, the contention window corresponding to each priority is increased to the next allowable value. Each of C and D is configured by the network, is preconfigured, is predefined, or is dependent on the implementation of UE 1. Optionally, C may be an integer, a non-integer, a positive number, or a non-positive number. Optionally, D may be an integer, a non-integer, a positive number, or a non-positive number.

3. When a ratio or a difference between received power measured by UE 1 on the PSFCH resource receiving the NACK and received power measured by UE 1 on the PSFCH resource receiving the ACK is greater than or equal to the threshold E, and/or when a ratio or a difference between the received power measured by UE 1 on the PSFCH resource receiving the ACK and the received power measured by UE 1 on the PSFCH resource receiving the NACK is smaller than or equal to the threshold F, the contention window corresponding to each priority is increased to the next allowable value. Each of E and F is configured by the network, is preconfigured, is predefined, or is dependent on the implementation of UE 1. Optionally, E may be an integer, a non-integer, a positive number, or a non-positive number. Optionally, F may be an integer, a non-integer, a positive number, or a non-positive number. Optionally, the received power includes, but is not limited to, RSRP and/or RSSI.

4. When the quantity of the NACKs received by UE 1 on the PSFCH resources used to receive the NACKs is smaller than or equal to the threshold G, and/or when the quantity of the ACKs received by UE 1 on the PSFCH resources used to receive the ACKs is greater than or equal to the threshold H, the contention window corresponding to each priority is adjusted to the minimum allowable value. Each of H and G is configured by the network, is preconfigured, is predefined, or is dependent on the implementation of UE 1. Optionally, H is greater than or equal to 0. For example, H is greater than 0. Optionally, G is greater than or equal to 0. For example, G is greater than 0. Optionally, H or G may be equal to 0. Optionally, G may be or may not be equal to H.

5. When the ratio or the difference between the quantity of the NACKs received by UE 1 on the PSFCH resources used to receive the NACKs and the quantity of the ACKs received by UE 1 on the PSFCH resources used to receive the ACKs is smaller than or equal to the threshold I, and/or when the ratio or the difference between the quantity of the ACKs received by UE 1 on the PSFCH resources used to receive the ACKs and the quantity of the NACKs received by UE 1 on the PSFCH resources used to receive the NACKs is greater than or equal to the threshold J, the contention window corresponding to each priority is adjusted to the minimum allowable value. Optionally, I may be an integer, a non-integer, a positive number, or a non-positive number. Optionally, J may be an integer, a non-integer, a positive number, or a non-positive number.

6. When the ratio or the difference between the received power measured by UE 1 on the PSFCH resource receiving the NACK and the received power measured by UE 1 on the PSFCH resource receiving the ACK is smaller than or equal to the threshold K, and/or when the ratio or the difference between the received power measured by UE 1 on the PSFCH resource receiving the ACK and the received power measured by UE 1 on the PSFCH resource receiving the NACK is greater than or equal to the threshold L, the contention window corresponding to each priority is adjusted to the minimum allowable value. Each of K and L is configured by the network, is preconfigured, is predefined, or is dependent on the implementation of UE 1. Optionally, K may be an integer, a non-integer, a positive number, or a non-positive number. Optionally, L may be an integer, a non-integer, a positive number, or a non-positive number. Optionally, the received power includes, but is not limited to, RSRP and/or RSSI.

When the above-mentioned plurality of UEs uses the feedback scheme of Case 2-2, e.g., in the lower part of FIG. 13, each of the above-mentioned plurality of UEs feeds back an NACK to UE 1 on its respective independent PSFCH resource in response to a reception failure, and feeds back an ACK to UE 1 on its respective independent PSFCH resource in response to a reception success. Or, each of the above-mentioned plurality of UEs corresponds to one independent PSFCH resource on which the UE may feed back, based on a decoding success or failure, an ACK or NACK to UE 1. The above-mentioned PSFCH resource is determined based on the time frequency resource position of the PSSCH transmission, or is configured by the network, or is preconfigured. On this basis, adjusting, by UE 1, the contention window corresponding to each priority based on the HARQ feedback values corresponding to the groupcast or broadcast PSSCH transmitted within the reference time unit or reference time period n includes one or more of the following 1, 2, 3, 4, 5, or 6.

1. When the quantity of the NACKs received by UE 1 on all the PSFCH resources is greater than or equal to the threshold M (or when a quantity of PSFCH resources on which UE 1 receives the NACKs is greater than or equal to the threshold M), and/or when the quantity of the ACKs received by UE 1 on all the PSFCH resources is smaller than or equal to the threshold O (or when a quantity of PSFCH resources on which UE 1 receives the ACKs is smaller than or equal to the threshold O), the contention window corresponding to each priority is increased to the next allowable value. Each of M and O is configured by the network, is preconfigured, is predefined, or is dependent on the implementation of UE 1. Optionally, M is greater than or equal to 0. For example, M is greater than 0. Optionally, O is greater than or equal to 0. For example, O is greater than 0.

2. When a ratio or a difference between the quantity of the NACKs received by UE 1 on all the PSFCH resources (or the quantity of the PSFCH resources on which UE 1 receives the NACKs) and the quantity of the ACKs received by UE 1 on all the PSFCH resources (or the quantity of the PSFCH resources on which UE 1 receives the ACKs) is greater than or equal to the threshold N, and/or when a ratio or a difference between the quantity of the ACKs received by UE 1 on all the PSFCH resources (or the quantity of the PSFCH resources on which UE 1 receives the ACKs) and the quantity of the NACKs received by UE 1 on all the PSFCH resources (or the quantity of the PSFCH resources on which UE 1 receives the NACKs) is smaller than or equal to the threshold P, the contention window corresponding to each priority is increased to the next allowable value. Each of N and P is configured by the network, is preconfigured, is predefined, or is dependent on the implementation of UE 1. Optionally, N may be an integer, a non-integer, a positive number, or a non-positive number. Optionally, P may be an integer, a non-integer, a positive number, or a non-positive number.

3. When a ratio between the quantity of the NACKs received by UE 1 on all the PSFCH resources (or, the quantity of the PSFCH resources on which UE 1 receives the NACKs) and a quantity of receivable ACKs/NACKs (or a quantity of all corresponding PSFCH resources) is greater than or equal to the threshold Q, and/or when a ratio between the quantity of the ACKs received by UE 1 on all the PSFCH resources (or the quantity of the PSFCH resources on which UE 1 receives the ACKs) and the quantity of the receivable ACKs/NACKs (or the quantity of all the corresponding PSFCH resources) is smaller than or equal to the threshold R, the contention window corresponding to each priority is increased to the next allowable value. Each of Q and R is configured by the network, is preconfigured, is predefined, or is dependent on the implementation of UE 1. Optionally, Q may be an integer, a non-integer, a positive number, or a non-positive number. Optionally, R may be an integer, a non-integer, a positive number, or a non-positive number.

4. When the quantity of the NACKs received by UE 1 on all the PSFCH resources (or the quantity of the PSFCH resources on which UE 1 receives the NACKs) is smaller than or equal to the threshold S, and/or when the quantity of the ACKs received by UE 1 on all the PSFCH resources (or the quantity of the PSFCH resources on which UE 1 receives the ACKs) is greater than or equal to the threshold T, the contention window corresponding to each priority is adjusted to the minimum allowable value. Each of S and T is configured by the network, is preconfigured, is predefined, or is dependent on the implementation of UE 1. Optionally, S is greater than or equal to 0. For example, S is greater than 0. Optionally, T is greater than or equal to 0. For example, T is greater than 0.

5. When the ratio or the difference between the quantity of the NACKs received by UE 1 on all the PSFCH resources (or the quantity of the PSFCH resources on which UE 1 receives the NACKs) and the quantity of the ACKs received by UE 1 on all the PSFCH resources (or the quantity of the PSFCH resources on which UE 1 receives the ACKs) is smaller than or equal to the threshold U, and/or when the ratio or the difference between the quantity of the ACKs received by UE 1 on all the PSFCH resources (or the quantity of the PSFCH resources on which UE 1 receives the ACKs) and the quantity of the NACKs received by UE 1 on all the PSFCH resources (or the quantity of the PSFCH resources on which UE 1 receives the NACKs) is greater than or equal to the threshold V, the contention window corresponding to each priority is adjusted to the minimum allowable value. Each of U and V is configured by the network, is preconfigured, is predefined, or is dependent on the implementation of UE 1. Optionally, U may be an integer, a non-integer, a positive number, or a non-positive number. Optionally, V may be an integer, a non-integer, a positive number, or a non-positive number.

6. When the ratio between the quantity of the NACKs received by UE 1 on all the PSFCH resources (or, the quantity of the PSFCH resources on which UE 1 receives the NACKs) and the quantity of the receivable ACKs/NACKs (or the quantity of all the corresponding PSFCH resources) is smaller than or equal to the threshold W, and/or when the ratio between the quantity of the ACKs received by UE 1 on all the PSFCH resources (or the quantity of the PSFCH resources on which UE 1 receives the ACKs) and the quantity of the receivable ACKs/NACKs (or the quantity of all the corresponding PSFCH resources) is greater than or equal to the threshold X, the contention window corresponding to each priority is adjusted to the minimum allowable value. Each of W and X is configured by the network, is preconfigured, is predefined, or is dependent on the implementation of UE 1. Optionally, W may be an integer, a non-integer, a positive number, or a non-positive number. Optionally, X may be an integer, a non-integer, a positive number, or a non-positive number.

Embodiment 6

In the embodiment, the first device is UE 1 and the first channel is the PSSCH. The PSSCH corresponding to no feedback information includes at least one of the following cases: the PSSCH is used for blind retransmission; no PSFCH resource is configured for a resource pool used by UE 1; or HARQ feedback is de-activated in the resource pool used by UE 1. UE 1 adjusts the contention window corresponding to each priority of the at least one priority, based on the feedback information for the PSSCH transmitted within the reference time unit or the reference time period (i.e., a case of no feedback).

UE 1 adjusts, based on the contention window used for the last channel occupancy or based on the received power measurement result, the contention window corresponding to each priority in accordance with at least one of the following methods 1, 2, or 3.

1. UE 1 adjusts the contention window corresponding to each priority to the contention window used or adjusted for the last channel occupancy.

2. When a channel of a time length Y is monitored by UE 1 and monitored energy or power is greater than or equal to a threshold Z, the contention window corresponding to each priority is increased to a next allowable value. Y is configured by the network, is preconfigured, is predefined, or is dependent on the implementation of the first device. Optionally, Y is a monitoring slot Tsl, or a monitoring time length Td or Tf determined based on Tsl.

3. When the channel of the time length Y is monitored by UE 1 and the monitored energy or power is smaller than or equal to the threshold Z, the contention window corresponding to each priority is adjusted to a minimum allowable value.

It should be understood that, the contention window adjusted for the last channel occupancy involved in the embodiments of the present disclosure can be interpreted as the adjusted contention window for the last channel occupancy or the adjusted contention window used for the last channel occupancy.

Figure 14:
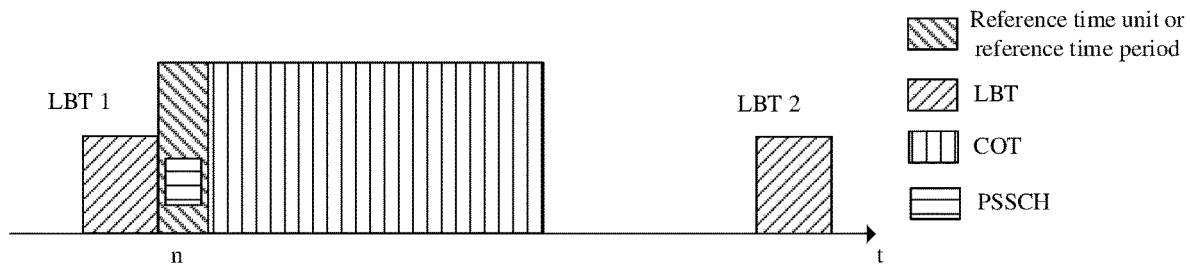

FIG. 14 is a schematic diagram showing feedback information for a first channel according to an embodiment of the present disclosure.

As illustrated in FIG. 14, LBT 2 is type 1 LBT. In LBT 2, UE 1 adjusts the contention window corresponding to each priority before determining Ninit. UE 1 determines the reference time unit or the reference time period. For example, the reference time unit is the start time unit of the last channel occupancy of UE 1, and the time unit may be the slot or the symbol or the subframe. Or, the reference time unit is the start time unit of the last channel occupancy which satisfies the condition that an HARQ feedback value for the PSSCH transmitted within the reference time unit is available. For example, the reference time period is the reference time period corresponding to the time period of the last channel occupancy of UE 1. Or, the reference time period is the reference time period corresponding to the time period of the last channel occupancy which satisfies the condition that an HARQ feedback value for the PSSCH transmitted within the reference time period is available. For the reference time period, e.g., in general, the start point of the reference time period coincides with the start point of the time period of the channel occupancy, and the end point of the reference time period is the end position of the start slot of the transmission of the PSSCH by UE 1 through the channel occupancy or the end position of the first group of PSSCH transmission opportunities transmitted by UE 1 through the channel occupancy. The group of PSSCH transmission opportunities mentioned above is defined as a group of consecutive PSSCH transmissions with the interval smaller than x microseconds. For example, in FIG. 14, UE 1 determines the reference time unit or the reference time period as the time length n.

Based on this, UE 1 transmits data to the plurality of UEs on the same PSSCH resource within the reference time unit or reference time period n. The transmission mode may be groupcast or multicast or broadcast.

When at least one of the following cases is satisfied: the PSSCH is used for the blind retransmission, the PSSCH corresponds to no HARQ feedback value, no PSFCH resource is configured for the resource pool used by UE 1, or the HARQ feedback is de-activated in the resource pool used by UE 1, UE 1 adjusts the contention window corresponding to each priority, based on a size of the contention window corresponding to each priority used or adjusted for a last channel access or occupancy. For example, in FIG. 14, before determining Ninit in LBT 2, UE 1 adjusts the contention window corresponding to each priority, based on the contention window corresponding to each priority used or adjusted for the last channel occupancy or last LBT or last type 1 LBT (e.g., LBT 1). For example, UE 1 adjusts the contention window corresponding to each priority to the contention window of each priority used or adjusted for the last channel occupancy or the last LBT or the last type 1 LBT (e.g., LBT 1). In another implementation, UE 1 monitors the channel of the time length Y. When UE 1 monitors the channel of the time length Y and the monitored energy or power is greater than or equal to the threshold Z, the contention window corresponding to each priority is increased to the next allowable value. Y is configured by the network, is preconfigured, is predefined, or is dependent on the implementation of the first device. Optionally, Y is the monitoring slot Tsl, or the monitoring time length Td or Tf determined based on Tsl. In another implementation, when UE 1 monitors the channel of the time length Y and the monitored energy or power is smaller than or equal to the threshold Z, the contention window corresponding to each priority is adjusted to the minimum allowable value.

While preferred implementations of the present disclosure have been described in detail above in conjunction with the accompanying drawings, the present disclosure is not limited to specific details in the above implementations. A variety of simple variants of the technical solutions of the present disclosure can be made within technical concepts of the present disclosure, and shall fall within the scope of the present disclosure. For example, various specific technical features described in the above specific implementations can be combined in any suitable way, without contradiction. To avoid unnecessary repetition, various possible combinations are not described separately in the present disclosure. For example, any combination of various implementations of the present disclosure can be made, and shall likewise be construed as disclosed in the present disclosure, as long as it is consistent with the concept of the present disclosure.

It should be understood that in various method embodiments of the present disclosure, numerical values of sequence numbers of the above processes do not mean an execution order and should not constitute any limitation to an implementation process of the embodiments of the present disclosure as the execution order of individual processes should be determined by their functions and internal logics. In addition, in the embodiments of the present disclosure, terms "downlink" and "uplink" are used to indicate directions of transmission of signals or data. "Downlink" is used to indicate that a direction of transmission of a signal or data is a first direction from a station to a user equipment in a cell. "Uplike" is used to indicate that a direction of transmission of a signal or data is a second direction from the user equipment in the cell to the station. For example, a "downlink signal" indicates that a direction of transmission of the signal is the first direction. In addition, the term "and/or" in the embodiments of the present disclosure only represents a relationship between correlated objects, including three relationships. In particular, "A and/or B" may mean three situations: A only, B only, or both A and B. In addition, the character "/" in the present disclosure generally represents an "or" relationship between the correlated objects preceding and succeeding the symbol.

The embodiments of the present disclosure have been described in detail above in conjunction with FIG. 8 to FIG. 14 from the point of view of the method for adjusting the contention window, and will be described below in conjunction with FIG. 15 to FIG. 17 from the point of view of the first device.

Figure 15:
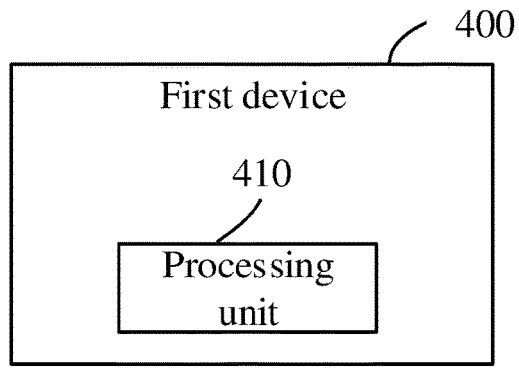
FIG. 15 and FIG. 16 each are a schematic block diagram showing a first device according to an embodiment of the present disclosure.

FIG. 15 illustrates a block diagram showing a first device 400 according to an embodiment of the present disclosure. The first device 400 may be a network device or a terminal device.

As illustrated in FIG. 15, the first device 400 may include a processing unit 410. The processing unit 410 can be configured to adjust a contention window corresponding to each priority of at least one priority, based on feedback information for a first channel transmitted within a reference time unit or a reference time period. A transmission mode of the first channel includes at least one of a groupcast transmission mode, a multicast transmission mode, or a broadcast transmission mode. For example, the transmission mode of the first channel includes at least one of the groupcast transmission mode, the multicast transmission mode, and the broadcast transmission mode. For example, the transmission mode of the first channel is the groupcast transmission mode, the multicast transmission mode, or the broadcast transmission mode.

In some embodiments, the processing unit 410 can be specifically configured to: when a feedback scheme for the first channel is an NACK-Only feedback scheme of feeding back NACK only, adjust the contention window corresponding to each priority based on at least one of a quantity of received NACKs, a proportion of the received NACKs, or power on a resource used to receive the NACK.

In an implementation, the processing unit 410 can be specifically configured to: when second devices corresponding to the first channel transmit feedback information on a same resource, adjust the contention window corresponding to each priority in accordance with at least one of the following 1, 2, 3, 4, 5, or 6. For example, when all second devices corresponding to the first channel transmit the feedback information on a same resource, the processing unit 410 can be configured to adjust the contention window corresponding to each priority in accordance with at least one of the following 1, 2, 3, 4, 5, or 6.

1. When the NACK is received, the contention window corresponding to each priority can be increased to a next allowable value.

2. When the quantity of the received NACKs is greater than or equal to P, the contention window corresponding to each priority can be increased to the next allowable value. P can be configured by a network, can be preconfigured, can be predefined, or can be dependent on an implementation of the first device. Optionally, P is greater than or equal to 0. For example, P is greater than 0.

3. When received power measured on the resource receiving the NACK is greater than or equal to a threshold H, the contention window corresponding to each priority can be increased to the next allowable value. H can be configured by the network, can be preconfigured, can be predefined, or can be dependent on the implementation of the first device.

Optionally, H may be an integer or a non-integer. Optionally, the received power includes, but is not limited to, Reference Signal Receiving Power (RSRP) and/or Received Signal Strength Indication (RSSI).

4. When no NACK is received, the contention window corresponding to each priority can be adjusted to a minimum allowable value.

5. When the quantity of the received NACKs is smaller than or equal to P, the contention window corresponding to each priority can be adjusted to the minimum allowable value.

6. When the received power measured on the resource receiving the NACK is smaller than or equal to the threshold H, the contention window corresponding to each priority can be adjusted to the minimum allowable value.

In an implementation, the processing unit 410 can be specifically configured to: when second devices corresponding to the first channel transmit feedback information on their respective independent resources, adjust the contention window corresponding to each priority in accordance with at least one of the following 1, 2, 3, 4, 5, or 6. For example, when all second devices corresponding to the first channel transmit the feedback information on their respective independent resources, the processing unit 410 can be configured to adjust the contention window corresponding to each priority in accordance with at least one of the following 1, 2, 3, 4, 5, or 6.

1. When the NACK is received, the contention window corresponding to each priority can be increased to a next allowable value.

2. When the quantity of the received NACKs is greater than or equal to P, the contention window corresponding to each priority can be increased to the next allowable value. P can be configured by a network, can be preconfigured, can be predefined, or can be dependent on an implementation of the first device. Optionally, P is greater than or equal to 0. For example, P is greater than 0.

3. When the proportion of the received NACKs is greater than or equal to F %, the contention window corresponding to each priority can be increased to the next allowable value. F can be configured by the network, can be preconfigured, can be predefined, or can be dependent on the implementation of the first device. Optionally, F is greater than or equal to 0. For example, F is greater than 0. Optionally, F may be an integer or a non-integer.

4. When no NACK is received, the contention window corresponding to each priority can be adjusted to a minimum allowable value.

5. When the quantity of the received NACKs is smaller than or equal to P, the contention window corresponding to each priority can be adjusted to the minimum allowable value.

6. When the proportion of the received NACKs is smaller than or equal to F %, the contention window corresponding to each priority can be adjusted to the minimum allowable value.

In some embodiments, the processing unit 410 can be specifically configured to: when a feedback scheme for the first channel is an ACK/NACK feedback scheme of feeding back ACK/NACK, adjust the contention window corresponding to each priority based on at least one of a quantity of received ACKs, a proportion of the received ACKs, power on a resource used to receive the ACK, a quantity of received NACKs, a proportion of the received NACKs, or power on a resource used to receive the NACK.

In an implementation, the processing unit 410 can be specifically configured to: when second devices corresponding to the first channel feed back the ACK on a first resource and the NACK on a second resource different from the first resource, adjust the contention window corresponding to each priority in accordance with at least one of the following 1, 2, 3, 4, 5, or 6. For example, when all second devices corresponding to the first channel feed back the ACK on the first resource and the NACK on the second resource, the processing unit 410 can be configured to adjust the contention window corresponding to each priority in accordance with at least one of the following 1, 2, 3, 4, 5, or 6.

1. When the quantity of the received NACKs is greater than or equal to a threshold A, and/or when the quantity of the received ACKs is smaller than or equal to a threshold B, the contention window corresponding to each priority can be increased to a next allowable value. Each of A and B can be configured by a network, can be preconfigured, can be predefined, or can be dependent on an implementation of the first device. Optionally, A is greater than or equal to 0. For example, A is greater than 0. Optionally, B is greater than or equal to 0. For example, B is greater than 0. Optionally, A or B may be equal to 0. Optionally, A may be or may not be equal to B.

2. When a ratio or a difference between the quantity of the received NACKs and the quantity of the received ACKs is greater than or equal to a threshold C, and/or when a ratio or a difference between the quantity of the received ACKs and the quantity of the received NACKs is smaller than or equal to a threshold D, the contention window corresponding to each priority can be increased to the next allowable value. Each of C and D can be configured by the network, can be preconfigured, can be predefined, or can be dependent on the implementation of the first device. Optionally, C may be an integer, a non-integer, a positive number, or a non-positive number. Optionally, D may be an integer, a non-integer, a positive number, or a non-positive number.

3. When a ratio or a difference between received power measured on the resource receiving the NACK and received power measured on the resource receiving the ACK is greater than or equal to a threshold E, and/or when a ratio or a difference between the received power measured on the resource receiving the ACK and the received power measured on the resource receiving the NACK is smaller than or equal to a threshold F, the contention window corresponding to each priority can be increased to the next allowable value. Each of E and F can be configured by the network, can be preconfigured, can be predefined, or can be dependent on the implementation of the first device. Optionally, E may be an integer, a non-integer, a positive number, or a non-positive number. Optionally, F may be an integer, a non-integer, a positive number, or a non-positive number. Optionally, the received power includes, but is not limited to, RSRP and/or RSSI.

4. When the quantity of the received NACKs is smaller than or equal to a threshold G, and/or when the quantity of the received ACKs is greater than or equal to a threshold H, the contention window corresponding to each priority can be adjusted to a minimum allowable value. Each of H and G can be configured by the network, can be preconfigured, can be predefined, or can be dependent on the implementation of the first device. Optionally, H is greater than or equal to 0. For example, H is greater than 0. Optionally, G is greater than or equal to 0. For example, G is greater than 0. Optionally, H or G may be equal to 0. Optionally, G may be or may not be equal to H.

5. When the ratio or the difference between the quantity of the received NACKs and the quantity of the received ACKs is smaller than or equal to a threshold I, and/or when the ratio or the difference between the quantity of the received ACKs and the quantity of the received NACKs is greater than or equal to a threshold J, the contention window corresponding to each priority can be adjusted to the minimum allowable value. Optionally, I may be an integer, a non-integer, a positive number, or a non-positive number. Optionally, J may be an integer, a non-integer, a positive number, or a non-positive number.

6. When the ratio or the difference between the received power measured on the resource receiving the NACK and the received power measured on the resource receiving the ACK is smaller than or equal to a threshold K, and/or when the ratio or the difference between the received power measured on the resource receiving the ACK and the received power measured on the resource receiving the NACK is greater than or equal to a threshold L, the contention window corresponding to each priority can be adjusted to the minimum allowable value. Each of K and L can be configured by the network, can be preconfigured, can be predefined, or can be dependent on the implementation of the first device. Optionally, K may be an integer, a non-integer, a positive number, or a non-positive number. Optionally, L may be an integer, a non-integer, a positive number, or a non-positive number. Optionally, the received power includes, but is not limited to, RSRP and/or RSSI.

In an implementation, the processing unit 410 can be specifically configured to: when second devices corresponding to the first channel feed back the ACK or the NACK on their respective independent resources, adjust the contention window corresponding to each priority in accordance with at least one of the following 1, 2, 3, 4, 5, or 6. For example, when all second devices corresponding to the first channel feed back the ACK or the NACK on their respective independent resources, the processing unit 410 can be configured to adjust the contention window corresponding to each priority in accordance with at least one of the following 1, 2, 3, 4, 5, or 6.

1. When the quantity of the received NACKs is greater than or equal to a threshold M, and/or when the quantity of the received ACKs is smaller than or equal to a threshold O, the contention window corresponding to each priority can be increased to a next allowable value. Each of M and O can be configured by a network, can be preconfigured, can be predefined, or can be dependent on an implementation of the first device. Optionally, M is greater than or equal to 0. For example, M is greater than 0. Optionally, O is greater than or equal to 0. For example, O is greater than 0.

2. When a ratio or a difference between the quantity of the received NACKs and the quantity of the received ACKs is greater than or equal to a threshold N, and/or when a ratio or a difference between the quantity of the received ACKs and the quantity of the received NACKs is smaller than or equal to a threshold P, the contention window corresponding to each priority can be increased to the next allowable value. Each of N and P can be configured by the network, can be preconfigured, can be predefined, or can be dependent on the implementation of the first device. Optionally, N may be an integer, a non-integer, a positive number, or a non-positive number. Optionally, P may be an integer, a non-integer, a positive number, or a non-positive number.

3. When a ratio between the quantity of the received NACKs and a quantity of receivable ACKs/NACKs is greater than or equal to a threshold Q, and/or when a ratio between the quantity of the received ACKs and the quantity of the receivable ACKs/NACKs is smaller than or equal to a threshold R, the contention window corresponding to each priority can be increased to the next allowable value. Each of Q and R can be configured by the network, can be preconfigured, can be predefined, or can be dependent on the implementation of the first device. Optionally, Q may be an integer, a non-integer, a positive number, or a non-positive number. Optionally, R may be an integer, a non-integer, a positive number, or a non-positive number.

4. When the quantity of the received NACKs is smaller than or equal to a threshold S, and/or when the quantity of the received ACKs is greater than or equal to a threshold T, the contention window corresponding to each priority can be adjusted to a minimum allowable value. Each of S and T can be configured by the network, can be preconfigured, can be predefined, or can be dependent on the implementation of the first device. Optionally, S is greater than or equal to 0. For example, S is greater than 0. Optionally, T is greater than or equal to 0. For example, T is greater than 0.

5. When the ratio or the difference between the quantity of the received NACKs and the quantity of the received ACKs is smaller than or equal to a threshold U, and/or when the ratio or the difference between the quantity of the received ACKs and the quantity of the received NACKs is greater than or equal to a threshold V, the contention window corresponding to each priority can be adjusted to the minimum allowable value. Each of U and V can be configured by the network, can be preconfigured, can be predefined, or can be dependent on the implementation of the first device. Optionally, U may be an integer, a non-integer, a positive number, or a non-positive number. Optionally, V may be an integer, a non-integer, a positive number, or a non-positive number.

6. When the ratio between the quantity of the received NACKs and the quantity of the receivable ACKs/NACKs is smaller than or equal to a threshold W, and/or when the ratio between the quantity of the received ACKs and the quantity of the receivable ACKs/NACKs is greater than or equal to a threshold X, the contention window corresponding to each priority can be adjusted to the minimum allowable value. Each of W and X can be configured by the network, can be preconfigured, can be predefined, or can be dependent on the implementation of the first device. Optionally, W may be an integer, a non-integer, a positive number, or a non-positive number. Optionally, X may be an integer, a non-integer, a positive number, or a non-positive number.

In some embodiments, the processing unit 410 can be specifically configured to: when the first channel corresponds to no feedback information, adjust the contention window corresponding to each priority based on a contention window used for a last channel occupancy or based on a received power measurement result. That is, when the first channel has no feedback or corresponds to no feedback method, the processing unit 410 can be configured to adjust the contention window corresponding to each priority based on the contention window used for the last channel occupancy or based on the received power measurement result.

In an implementation, the processing unit 410 can be specifically configured to: adjust, based on the contention window used for the last channel occupancy or based on the received power measurement result, the contention window corresponding to each priority in accordance with at least one of the following methods 1, 2, or 3.

1. The contention window corresponding to each priority can be adjusted to the contention window used or adjusted for the last channel occupancy.

2. When a channel of a time length Y is monitored and monitored energy or power is greater than or equal to a threshold Z, the contention window corresponding to each priority can be increased to a next allowable value. Y can be configured by a network, can be preconfigured, can be predefined, or can be dependent on an implementation of the first device. Optionally, Y is a monitoring slot Tsl, or a monitoring time length Td or Tf determined based on Tsl.

3. When the channel of the time length Y is monitored and the monitored energy or power is smaller than or equal to the threshold Z, the contention window corresponding to each priority can be adjusted to a minimum allowable value.

In some embodiments, the first channel can correspond to no feedback information in at least one of the following cases: the first channel is used for blind retransmission; the first device is a terminal device, and no PSFCH resource is configured for a resource pool used by the terminal device; or the first device is the terminal device, and HARQ feedback is de-activated in the resource pool used by the terminal device.

In some embodiments, the first device can be a network device, and the first channel can include a PDSCH.

In some embodiments, the first device can be a terminal device, and the first channel can include a PSCCH and/or a PSSCH.

In some embodiments, the method 300 can further include: determining the reference time unit or the reference time period.

In some embodiments, the reference time unit can be a start time unit of a last channel occupancy of the first device, and/or the reference time period can be a start time period of the last channel occupancy of the first device.

In some embodiments, the method 300 can further include: receiving feedback information corresponding to the first channel within the reference time unit or the reference time period.

It should be understood that the device embodiments and the method embodiments may correspond to each other. Similar description of the device embodiments can be referred to the method embodiments. Specifically, the first device 400 illustrated in FIG. 15 may correspond to a corresponding subject for performing the method 200 according to the embodiments of the present disclosure. In addition, the above and other operations and/or functions of each unit in the first device 400 are used to implement corresponding processes in the method 200. For simplicity, details thereof will be omitted herein.

The communication device according to the embodiments of the present disclosure is described above in connection with the accompanying drawings from the perspective of a functional module. It should be understood that the functional module can be implemented in the form of hardware, or in the form of instructions in software, or in a combination of hardware and software modules. Specifically, the steps of the method embodiments in the embodiments of the present disclosure may be accomplished by an integrated logic circuit in the form of hardware and/or instructions in the form of software in a processor. The steps of the method disclosed in combination with the embodiments of the present disclosure may be directly embodied as being performed by a hardware decoding processor, or by a combination of hardware and software modules in the decoding processor. Optionally, the software modules can be located in a known storage medium in the related art, such as a random access memory, a flash memory, a read-only memory, a programmable read-only memory, an electrically erasable programmable memory, or a register. The storage medium can be located in the memory. The processor can read information from the memory and perform the steps of the above method embodiments in combination with its hardware. For example, the processing unit 410 mentioned above may be implemented by a processor.

Figure 16:
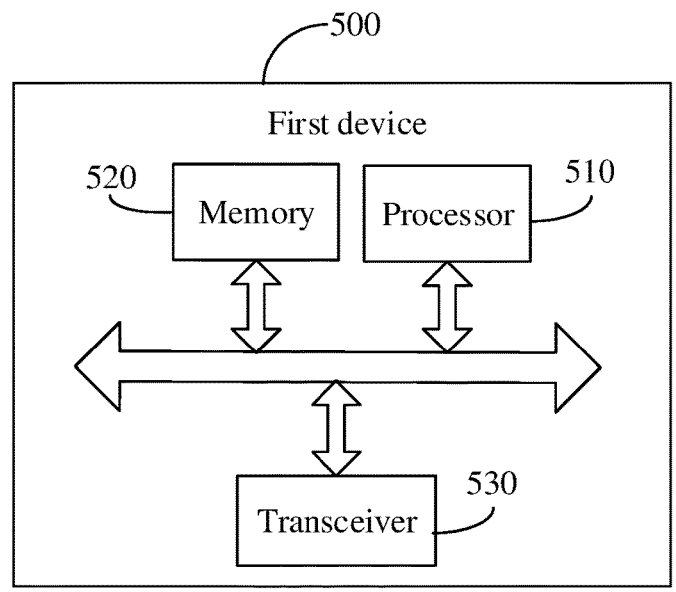

FIG. 16 is a block diagram showing a structure of a first device 500 according to an embodiment of the present disclosure.

As illustrated in FIG. 16, the first device 500 may include a processor 510.

The processor 510 may invoke and execute a computer program from a memory to implement the method according to any of the embodiments of the present disclosure.

As illustrated in FIG. 16, the first device 500 may further include a memory 520.

The memory 520 can be configured to store indication information, and can also be configured to store codes, instructions, etc., executed by the processor 510. The processor 510 may invoke and execute a computer program from the memory 520 to implement the method according to any of the embodiments of the present disclosure. The memory 520 may be a separate component independent of the processor 510, or may be integrated in the processor 510.

Referring to FIG. 16, the first device 500 may further include a transceiver 530.

The processor 510 may control the transceiver 530 to communicate with other devices, specifically, to transmit information or data to other devices, or receive information or data transmitted by other devices. The transceiver 530 may include a transmitter and a receiver. The transceiver 530 may further include one or more antennas.

It should be understood that various components of the first device 500 are connected via a bus system. The bus system includes a power bus, a control bus, and a state signal bus in addition to a data bus.

It should also be understood that, the first device 500 may be the terminal terminal/network device according to any of the embodiments of the present disclosure. The first device 500 may implement corresponding processes implemented by a corresponding device in the method according to any of the embodiments of the present disclosure. That is, the first device 500 according to the embodiments of the present disclosure may correspond to the first device 400 mentioned above, and may correspond to a corresponding subject for performing the method 200 according to the embodiments of the present disclosure. For simplicity, details thereof will be omitted herein.

In addition, a chip is further provided according to the embodiments of the present disclosure.

For example, the chip may be an integrated circuit chip with a signal processing capability, and can implement or perform the methods, steps, and logical block diagrams disclosed in the embodiments of the present disclosure. The chip may also be referred to as a system-level chip, a system-chip, a chip system, or a system-on-chip. Optionally, the chip may be applied in various communication devices to cause a communication device provided with the chip to perform the methods, steps and logical block diagrams disclosed in embodiments of the present disclosure.

Figure 17:
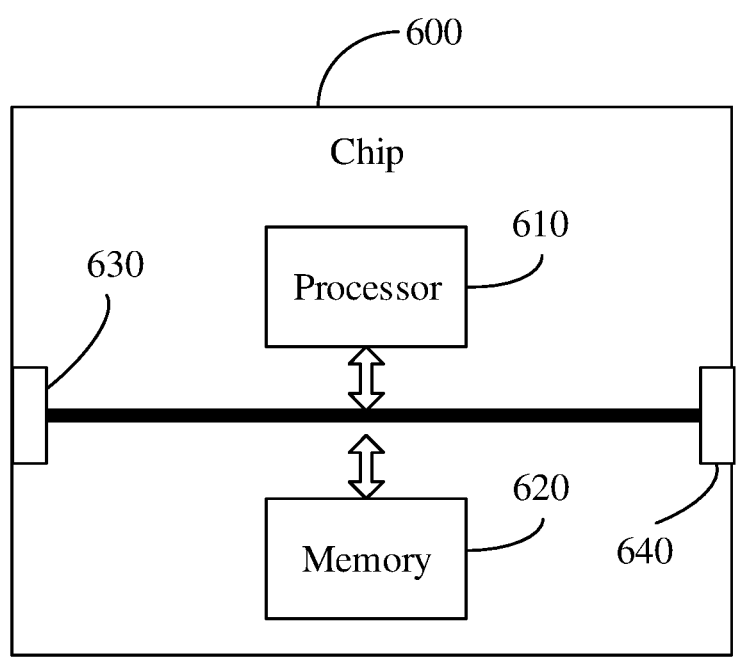
FIG. 17 is a schematic block diagram showing a chip according to an embodiment of the present disclosure.

FIG. 17 is a block diagram showing a structure of a chip 600 according to an embodiment of the present disclosure.

As illustrated in FIG. 17, the chip 600 includes a processor 610.

The processor 610 can invoke and execute a computer program from a memory to implement the method according to any of the embodiments of the present disclosure.

As illustrated in FIG. 17, the chip 600 may further include a memory 620.

The processor 610 may invoke and execute a computer program from the memory 620 to implement the method according to any of the embodiments of the present disclosure. The memory 620 may be configured to store instruction information, and may further be configured to store codes, instructions, etc., executed by the processor 610. The memory 620 may be a separate component independent of the processor 610, or may be integrated in the processor 610.

As illustrated in FIG. 17, the chip 600 may further include an input interface 630.

The processor 610 may control the input interface 630 to communicate with other devices or chips, specifically, to obtain information or data transmitted by other devices or chips.

As illustrated in FIG. 17, the chip 600 may further include an output interface 640.

The processor 610 may control the output interface 640 to communicate with other devices or chips, specifically, to output information or data to other devices or chips.

It should be understood that the chip 600 may be applied in the network device according to the embodiments of the present disclosure, and may implement the corresponding processes implemented by the network device or the terminal device in any of the methods according to the embodiments of the present disclosure. For simplicity, details thereof will be omitted herein.

It should further be understood that various components of the chip 600 are connected via a bus system. The bus system includes a power bus, a control bus, and a state signal bus in addition to a data bus.

The processor mentioned above may include, but is not limited to, a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component.

The processor may be configured to implement or perform each method, step, and logical block diagram disclosed in the embodiments of the present disclosure. The steps of the method disclosed in conjunction with the embodiments of the present disclosure may be directly embodied as being performed by a hardware decoding processor, or by a combination of hardware and software modules in the decoding processor. The software module can be located in a known storage medium in the related art, such as a random access memory, a flash memory, a read-only memory, a programmable read-only memory, an erasable programmable memory, or a register. The storage medium is located in the memory. The processor reads information from the memory and performs the steps of the above method in combination with its hardware.

The memory mentioned above includes, but is not limited to, a volatile memory and/or a non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, many forms of RAMs are available, including for example a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM)), and a Direct Rambus RAM (DR RAM).

It should be noted that the memory described in the present disclosure is intended to include these and any other suitable types of memories.

The embodiments of the present disclosure further provide a computer-readable storage medium configured to store a computer program. The computer-readable storage medium stores one or more programs. The one or more programs include instructions. The instructions, when executed by a portable electronic device including a plurality of applications, enable the portable electronic device to perform the method 200 according to any of the method embodiments. Optionally, the computer-readable storage medium may be applied in the first device according to the embodiments of the present disclosure. The computer program causes a computer to perform corresponding processes implemented by the first device in any of the methods according to the embodiments of the present disclosure. For brevity, details thereof will be omitted herein.

The embodiments of the present disclosure further provide a computer program product including a computer program. Optionally, the computer program product may be applied in the first device according to the embodiments of the present disclosure. The computer program causes a computer to perform corresponding processes implemented by the first device in any of the methods according to the embodiments of the present disclosure. For brevity, details thereof will be omitted herein.

The embodiments of the present disclosure further provide a computer program. The computer program, when executed by a computer, causes the computer to perform the method 200 according to any of the method embodiments. Optionally, the computer program may be applied in the first device according to the embodiments of the present disclosure. The computer program, when executed on a computer, causes the computer to perform corresponding processes implemented by the first device in any of the methods according to the embodiments of the present disclosure. For brevity, details thereof will be omitted herein.

In addition, the embodiments of the present disclosure further provide a communication system. The communication system may include the first device mentioned above. It should be noted that the term "system" etc., in the present disclosure may also be referred to as a "network management architecture", a "network system", or the like.

It should also be understood that the terms used in the embodiments of the present disclosure and the appended claims are only for a purpose of describing specific embodiments, and are not intended to limit the embodiments of the present disclosure. For example, singular forms of "a", "said", "above", and "the" used in the embodiments of the present disclosure and appended claims also include plural forms, unless the context clearly indicates other meanings.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of the embodiments of the present disclosure. When the function is implemented in the form of a software functional unit and sold or used as a standalone product, it can be stored in a computer-readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include various media capable of storing program codes, such as a Universal Serial Bus flash drive, a mobile hard disk, an ROM, an RAM, a magnetic disk, or an optical disc.

Those skilled in the art can clearly understand that, for the convenience and conciseness of the description, for the specific operation processes of the systems, devices, and units described above, reference can be made to the corresponding processes in the foregoing method embodiments, and details thereof will be omitted herein.

In the embodiments of the present disclosure, it can be appreciated that the disclosed systems, devices, and methods may be implemented in other ways. For example, the divisions of the units or modules or components in the above-mentioned device embodiments are only divisions based on logical functions, and there may be other divisions in actual implementations. For example, more than one unit or module or component may be combined or integrated into another system, or some units or modules or components can be ignored or omitted. For example, the units/modules/components described as separate/display components may or may not be physically separated, that is, they may be co-located or distributed across a number of network elements. Some or all of the units/modules/components may be selected as desired to achieve the objects of the embodiments of the present disclosure.

Finally, it should be noted that mutual coupling or direct coupling or communication connections illustrated or discussed above may be indirect coupling or communication connections via an interface, a device, or a unit, and may be in electrical, mechanical, or other forms. While the specific implementations of the embodiments of the present disclosure have been described above, the scope of the embodiments of the present disclosure is not limited to these implementations. Various variants and alternatives can be easily conceived by any of those skilled in the art without departing from the technical scope of the embodiments of the present disclosure. Therefore, these variants and alternatives are to be encompassed by the scope of the embodiments of the present disclosure as defined by the claims as appended.

What is claimed is:

1. A wireless communication method, comprising:
adjusting, by a first device, a contention window corresponding to each priority of at least one priority based on feedback information for a first channel, wherein the first channel is transmitted within a reference time unit or a reference time period, the at least one priority is a channel access priority, and a transmission mode of the first channel comprises at least one of a groupcast transmission mode, a multicast transmission mode, or a broadcast transmission mode;
wherein said adjusting, by the first device, the contention window corresponding to each priority of the at least one priority based on the feedback information for the first channel transmitted within the reference time unit or the reference time period comprises:
when a feedback scheme for the first channel is an Acknowledgement (ACK)/NACK feedback scheme, adjusting, by the first device, the contention window corresponding to each priority based on at least one of a quantity of received ACKs, or a proportion of the received ACKs.

2. The method according to claim 1, wherein said adjusting, by the first device, the contention window corresponding to each priority of the at least one priority based on the feedback information for the first channel transmitted within the reference time unit or the reference time period comprises:
when a feedback scheme for the first channel is a Negative ACKnowledgement (NACK)-Only feedback scheme of feeding back NACK only, adjusting, by the first device, the contention window corresponding to each priority based on at least one of a quantity of received NACKs, a proportion of the received NACKs, or power on a resource used to receive the NACK.

3. The method according to claim 2, wherein said adjusting, by the first device, the contention window corresponding to each priority based on the at least one of the quantity of the received NACKs, the proportion of the received NACKs, or the power on the resource used to receive the NACK comprises:
when second devices corresponding to the first channel transmit feedback information on a same resource, adjusting, by the first device, the contention window corresponding to each priority by at least one of:
when the NACK is received, increasing the contention window corresponding to each priority to a next allowable value;
when the quantity of the received NACKs is greater than or equal to P, increasing the contention window corresponding to each priority to the next allowable value, wherein P is configured by a network, is preconfigured, is predefined, or is dependent on an implementation of the first device, wherein P is greater than or equal to 0;
when received power measured on the resource receiving the NACK is greater than or equal to a threshold H, increasing the contention window corresponding to each priority to the next allowable value, wherein H is configured by the network, is preconfigured, is predefined, or is dependent on the implementation of the first device, wherein H is greater than or equal to 0;
when no NACK is received, adjusting the contention window corresponding to each priority to a minimum allowable value;
when the quantity of the received NACKs is smaller than or equal to P, adjusting the contention window corresponding to each priority to the minimum allowable value; or
when the received power measured on the resource receiving the NACK is smaller than or equal to the threshold H, adjusting the contention window corresponding to each priority to the minimum allowable value.

4. The method according to claim 2, wherein said adjusting, by the first device, the contention window corresponding to each priority based on the at least one of the quantity of the received NACKs, the proportion of the received NACKs, or the power on the resource used to receive the NACK comprises:
when second devices corresponding to the first channel transmit feedback information on their respective independent resources, adjusting, by the first device, the contention window corresponding to each priority by at least one of:
when the NACK is received, increasing the contention window corresponding to each priority to a next allowable value;
when the quantity of the received NACKs is greater than or equal to P, increasing the contention window corresponding to each priority to the next allowable value, wherein P is configured by a network, is preconfigured, is predefined, or is dependent on an implementation of the first device, wherein P is greater than or equal to 0;
when the proportion of the received NACKs is greater than or equal to F %, increasing the contention window corresponding to each priority to the next allowable value, wherein F is configured by the network, is preconfigured, is predefined, or is dependent on the implementation of the first device, wherein F is greater than or equal to 0;
when no NACK is received, adjusting the contention window corresponding to each priority to a minimum allowable value;
when the quantity of the received NACKs is smaller than or equal to P, adjusting the contention window corresponding to each priority to the minimum allowable value; or
when the proportion of the received NACKs is smaller than or equal to F %, adjusting the contention window corresponding to each priority to the minimum allowable value.

5. The method according to claim 1, wherein said adjusting, by the first device, the contention window corresponding to each priority based on the at least one of the quantity of the received ACKs, or the proportion of the received ACKs, comprises:
when second devices corresponding to the first channel feed back the ACK or the NACK on respective independent resources, adjusting, by the first device, the contention window corresponding to each priority by at least one of:
when the quantity of the received ACKs is smaller than or equal to a threshold O, increasing the contention window corresponding to each priority to a next allowable value, wherein O is configured by a network, is preconfigured, is predefined, or is dependent on an implementation of the first device, wherein O is greater than or equal to 0;
when a ratio between the quantity of the received ACKs and the quantity of the receivable ACKs/NACKs is smaller than or equal to a threshold R, increasing the contention window corresponding to each priority to the next allowable value, wherein R is configured by the network, is preconfigured, is predefined, or is dependent on the implementation of the first device, wherein R is an integer or a non-integer;
when the quantity of the received ACKs is greater than or equal to a threshold T, adjusting the contention window corresponding to each priority to a minimum allowable value, wherein T is configured by the network, is preconfigured, is predefined, or is dependent on the implementation of the first device, wherein T is greater than or equal to 0; or
when the ratio between the quantity of the received ACKs and the quantity of the receivable ACKs/NACKs is greater than or equal to a threshold X, adjusting the contention window corresponding to each priority to the minimum allowable value, wherein X is configured by the network, is preconfigured, is predefined, or is dependent on the implementation of the first device, wherein X is an integer or a non-integer.

6. The method according to claim 1, wherein said adjusting, by the first device, the contention window corresponding to each priority of the at least one priority based on the feedback information for the first channel transmitted within the reference time unit or the reference time period comprises:

when the first channel corresponds to no feedback information, adjusting, by the first device, the contention window corresponding to each priority based on a contention window used for a last channel occupancy or based on a received power measurement result.

7. The method according to claim 6, wherein said adjusting, by the first device, the contention window corresponding to each priority based on the contention window used for the last channel occupancy or based on the received power measurement result comprises:

adjusting, by the first device based on the contention window used for the last channel occupancy or based on the received power measurement result, the contention window corresponding to each priority by at least one of:

adjusting, by the first device, the contention window corresponding to each priority to the contention window used or adjusted for the last channel occupancy;

when a channel of a time length Y is being monitored and monitored energy or power is greater than or equal to a threshold Z, increasing the contention window corresponding to each priority to a next allowable value, wherein Y is configured by a network, is preconfigured, is predefined, or is dependent on an implementation of the first device, wherein Y is greater than or equal to 0, and Z is greater than or equal to 0; or when the channel of the time length Y is being monitored and the monitored energy or power is smaller than or equal to the threshold Z, adjusting the contention window corresponding to each priority to a minimum allowable value.

8. The method according to claim 6, wherein the first channel corresponds to no feedback information in at least one of the following cases:

the first channel is used for blind retransmission;

the first device is a terminal device, and no Physical Sidelink Feedback Channel (PSFCH) resource is configured for a resource pool used by the terminal device; or the first device is the terminal device, and Hybrid Automatic Repeat reQuest (HARQ) feedback is de-activated in the resource pool used by the terminal device.

9. The method according to claim 1, wherein the first device is a network device, and wherein the first channel comprises a Physical Downlink Shared Channel (PDSCH).

10. The method according to claim 1, wherein the first device is a terminal device, and wherein the first channel comprises a Physical Sidelink Control Channel (PSCCH) and/or a Physical Sidelink Shared Channel (PSSCH).

11. The method according to claim 1, further comprising:

determining, by the first device, the reference time unit or the reference time period.

12. The method according to claim 1, wherein the reference time unit is a start time unit of a last channel occupancy of the first device, and/or the reference time period is a start time period of the last channel occupancy of the first device.

13. The method according to claim 1, further comprising:

receiving, by the first device, feedback information corresponding to the first channel within the reference time unit or the reference time period.

14. A first device, comprising:
a processor; and
a memory,
wherein the memory has a computer program stored thereon, and the processor is configured to invoke and execute the computer program stored in the memory to perform a wireless communication method comprising:

adjusting, by the first device, a contention window corresponding to each priority of at least one priority based on feedback information for a first channel, wherein the first channel is transmitted within a reference time unit or a reference time period, the at least one priority is a channel access priority, and a transmission mode of the first channel comprises at least one of a groupcast transmission mode, a multicast transmission mode, or a broadcast transmission mode;

wherein said adjusting, by the first device, the contention window corresponding to each priority of the at least one priority based on the feedback information for the first channel transmitted within the reference time unit or the reference time period comprises:

when a feedback scheme for the first channel is an Acknowledgement (ACK)/NACK feedback scheme, adjusting, by the first device, the contention window corresponding to each priority based on at least one of a quantity of received ACKs, or a proportion of the received ACKs.

15. The first device according to claim 14, wherein said adjusting, by the first device, the contention window corresponding to each priority of the at least one priority based on the feedback information for the first channel transmitted within the reference time unit or the reference time period comprises:

when a feedback scheme for the first channel is a Negative ACKnowledgement (NACK)-Only feedback scheme of feeding back NACK only, adjusting, by the first device, the contention window corresponding to each priority based on at least one of a quantity of received NACKs, a proportion of the received NACKs, or power on a resource used to receive the NACK.

16. The first device according to claim 15, wherein said adjusting, by the first device, the contention window corresponding to each priority based on the at least one of the quantity of the received NACKs, the proportion of the received NACKs, or the power on the resource used to receive the NACK comprises:

when second devices corresponding to the first channel transmit feedback information on a same resource, adjusting, by the first device, the contention window corresponding to each priority by at least one of:

when the NACK is received, increasing the contention window corresponding to each priority to a next allowable value;

when the quantity of the received NACKs is greater than or equal to P, increasing the contention window corresponding to each priority to the next allowable value, wherein P is configured by a network, is preconfigured, is predefined, or is dependent on an implementation of the first device, wherein P is greater than or equal to 0;

when received power measured on the resource receiving the NACK is greater than or equal to a threshold H, increasing the contention window corresponding to each priority to the next allowable value, wherein H is configured by the network, is preconfigured, is predefined, or is dependent on the implementation of the first device, wherein H is greater than or equal to 0;

when no NACK is received, adjusting the contention window corresponding to each priority to a minimum allowable value;

when the quantity of the received NACKs is smaller than or equal to P, adjusting the contention window corresponding to each priority to the minimum allowable value; or when the received power measured on the resource receiving the NACK is smaller than or equal to the threshold H, adjusting the contention window corresponding to each priority to the minimum allowable value.

17. The first device according to claim 15, wherein said adjusting, by the first device, the contention window corresponding to each priority based on the at least one of the quantity of the received NACKs, the proportion of the received NACKs, or the power on the resource used to receive the NACK comprises:

when second devices corresponding to the first channel transmit feedback information on their respective independent resources, adjusting, by the first device, the contention window corresponding to each priority by at least one of:

when the NACK is received, increasing the contention window corresponding to each priority to a next allowable value;

when the quantity of the received NACKs is greater than or equal to P, increasing the contention window corresponding to each priority to the next allowable value, wherein P is configured by a network, is preconfigured, is predefined, or is dependent on an implementation of the first device, wherein P is greater than or equal to 0;

when the proportion of the received NACKs is greater than or equal to F %, increasing the contention window corresponding to each priority to the next allowable value, wherein F is configured by the network, is preconfigured, is predefined, or is dependent on the implementation of the first device, wherein F is greater than or equal to 0;

when no NACK is received, adjusting the contention window corresponding to each priority to a minimum allowable value;

when the quantity of the received NACKs is smaller than or equal to P, adjusting the contention window corresponding to each priority to the minimum allowable value; or when the proportion of the received NACKs is smaller than or equal to F %, adjusting the contention window corresponding to each priority to the minimum allowable value.

* * * * *